United States Patent
Gkoulalas-Divanis et al.

(10) Patent No.: US 11,580,951 B2
(45) Date of Patent: Feb. 14, 2023

(54) SPEAKER IDENTITY AND CONTENT DE-IDENTIFICATION

(71) Applicant: INTERNATIONAL BUSINESS MACHINES CORPORATION, Armonk, NY (US)

(72) Inventors: Aris Gkoulalas-Divanis, Waltham, MA (US); Xu Wang, Westford, MA (US); Paul R. Bastide, Ashland, MA (US); Rohit Ranchal, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/452,563

(22) Filed: Oct. 27, 2021

(65) Prior Publication Data

US 2022/0044667 A1    Feb. 10, 2022

Related U.S. Application Data

(63) Continuation of application No. 16/860,840, filed on Apr. 28, 2020, now Pat. No. 11,217,223.

(51) Int. Cl.
    *G06F 16/35* (2019.01)
    *G10L 13/00* (2006.01)
    (Continued)

(52) U.S. Cl.
    CPC .......... *G10L 13/00* (2013.01); *G10L 15/1822* (2013.01); *G10L 15/26* (2013.01); *G10L 17/02* (2013.01)

(58) Field of Classification Search
None
See application file for complete search history.

(56) References Cited

U.S. PATENT DOCUMENTS

| 7,269,578 B2 | 9/2007 | Sweeney |
| 7,617,193 B2 | 11/2009 | Bitan et al. |
| (Continued) | | |

FOREIGN PATENT DOCUMENTS

| EP | 3496091 B1 | 6/2019 |
| JP | 2010231717 | 10/2010 |
| WO | 2019017500 A1 | 1/2019 |

OTHER PUBLICATIONS

Ibrahim, NS et al., "I-vector Extraction for Speaker Recognition Based on Dimensionality Reduction," Procedia Computer Science, Jan. 2018, pp. 1534-1540, Elsevier, The Netherlands.
(Continued)

*Primary Examiner* — Jakieda R Jackson
(74) *Attorney, Agent, or Firm* — Sherman IP LLP; Kenneth L. Sherman; Hemavathy Perumal

(57) ABSTRACT

One embodiment of the invention provides a method for speaker identity and content de-identification under privacy guarantees. The method comprises receiving input indicative of privacy protection levels to enforce, extracting features from a speech recorded in a voice recording, recognizing and extracting textual content from the speech, parsing the textual content to recognize privacy-sensitive personal information about an individual, generating de-identified textual content by anonymizing the personal information to an extent that satisfies the privacy protection levels and conceals the individual's identity, and mapping the de-identified textual content to a speaker who delivered the speech. The method further comprises generating a synthetic speaker identity based on other features that are dissimilar from the features to an extent that satisfies the privacy protection levels, and synthesizing a new speech waveform based on the synthetic speaker identity to deliver
(Continued)

the de-identified textual content. The new speech waveform conceals the speaker's identity.

18 Claims, 8 Drawing Sheets

(51) Int. Cl.
*G10L 15/18* (2013.01)
*G10L 15/26* (2006.01)
*G10L 17/02* (2013.01)

(56) References Cited

U.S. PATENT DOCUMENTS

| | | | |
|---|---|---|---|
| 8,285,540 | B2 | 10/2012 | Sato et al. |
| 8,468,244 | B2 | 6/2013 | Redlich |
| 8,924,852 | B2 | 12/2014 | Ikawa et al. |
| 9,043,250 | B2 | 5/2015 | Ling et al. |
| 9,081,978 | B1 | 7/2015 | Connolly et al. |
| 9,437,207 | B2* | 9/2016 | Jacob .............. H04M 1/64 |
| 9,705,908 | B1 | 7/2017 | Thakurta |
| 9,712,550 | B1 | 7/2017 | Thakurta |
| 9,846,716 | B1 | 12/2017 | Scott |
| 9,892,281 | B1 | 2/2018 | Scott |
| 10,573,312 | B1 | 2/2020 | Thomson |
| 10,783,990 | B2 | 9/2020 | Lyman et al. |
| 10,805,244 | B2 | 10/2020 | Gilbert |
| 10,938,779 | B2 | 3/2021 | Loyola et al. |
| 11,004,454 | B1* | 5/2021 | Srinivasan .............. G10L 17/04 |
| 11,107,564 | B2 | 8/2021 | Poblenz et al. |
| 2007/0133437 | A1 | 6/2007 | Wengrovitz |
| 2008/0077604 | A1 | 3/2008 | Bharara et al. |
| 2009/0254572 | A1 | 10/2009 | Redlich |
| 2011/0055185 | A1 | 3/2011 | Bitan et al. |
| 2014/0278366 | A1 | 9/2014 | Jacob |
| 2015/0081302 | A1 | 3/2015 | Syrdal |
| 2016/0203336 | A1 | 7/2016 | Nambiar et al. |
| 2016/0321582 | A1 | 11/2016 | Broudou et al. |
| 2017/0019356 | A1 | 1/2017 | Gilbert |
| 2017/0359364 | A1 | 12/2017 | Thakurta |
| 2019/0005952 | A1 | 1/2019 | Kruse |
| 2019/0018983 | A1 | 1/2019 | Anderson |
| 2019/0104124 | A1 | 4/2019 | Buford |
| 2019/0236310 | A1 | 8/2019 | Austin |
| 2019/0238516 | A1 | 8/2019 | Weggenmann et al. |
| 2019/0260784 | A1 | 8/2019 | Stockdale et al. |
| 2019/0318744 | A1 | 10/2019 | Bromand |
| 2019/0356672 | A1 | 11/2019 | Bondugula et al. |
| 2019/0371328 | A1 | 12/2019 | Wang |
| 2019/0385591 | A1 | 12/2019 | Shin et al. |
| 2020/0110903 | A1 | 4/2020 | Reilly |
| 2020/0151246 | A1 | 5/2020 | Mwarabu et al. |
| 2020/0160122 | A1 | 5/2020 | Lints et al. |
| 2020/0160301 | A1 | 5/2020 | Lyman et al. |
| 2020/0160969 | A1 | 5/2020 | Poblenz et al. |
| 2020/0320167 | A1 | 10/2020 | Mane |
| 2020/0394333 | A1 | 12/2020 | Norgeot |
| 2020/0402625 | A1 | 12/2020 | Aravamudan |
| 2021/0133254 | A1 | 5/2021 | Adam |
| 2021/0182111 | A1 | 6/2021 | Jakobsson |
| 2021/0243268 | A1 | 8/2021 | Ardhanari et al. |
| 2021/0256160 | A1 | 8/2021 | Hachey et al. |
| 2021/0279366 | A1 | 9/2021 | Choudhury et al. |
| 2021/0335464 | A1 | 10/2021 | Poblenz et al. |

OTHER PUBLICATIONS

List of IBM Patents or Applications Treated as Related; Filed Oct. 27, 2021; Gkoulalas-Divanis, A. et al., U.S. Appl. No. 16/860,857, filed Apr. 28, 2020; Gkoulalas-Divanis, A. et al., U.S. Appl. No. 16/860,857, filed Apr. 28, 2020.

Mell et al., "The NIST Definition of Cloud Computing," Recommendations of the National Institute of Standards and Technology, U.S. Department of Commerce, Special Publication 800-145, Sep. 2011, 7 pgs.

Meystre, S.M. et al., "Automatic de-identification of textual documents in the electronic health record: A review of recent research", BMC Medical Research Methodology, 2010, Chapter 26, pp. 1-16, downloaded Apr. 27, 2020, https://bmcmedresmethodol.biomedcentral.com/track/pdf/10.1186/1471-2288-10-70, United States.

Meystre, S.M. et al., "De-identification of unstructured clinical data for patient privacy protection", Springer's Medical Data Privacy Handbook, 2015, pp. 697-716, Springer, Cham, Switzerland {Abstract Only}.

Ribaric, S. et al., "Deidentification for privacy protection in multimedia content: A survey," Signal Processing: Image Communication, Sep. 2016, pp. 131-151, vol. 47, downloaded on 4/27/20/20, https://uhra.herts.ac.uk/bitstream/handle/2299/19652/Accepted_Manuscript.pdf?sequence=2, University of Hertfordshire, UK.

Snyder, D. et al., "X-Vectors: Robust DNN Embeddings for Speaker Recognition", IEEE International Conference on Acoustics, Speech and Signal Processing (ICASSP), Apr. 15, 2018, pp. 1-5, IEEE, United States.

Stubbs, A. et al., "Challenges in synthesizing surrogate PHI in narrative EMRs", Springer's Medical Data Privacy Handbook, 2015, Chapter 27, pp. 717-735, Springer, Cham, Switzerland.

\* cited by examiner

SPEAKER IDENTITY AND CONTENT DE-IDENTIFICATION

BACKGROUND

Embodiments of the invention generally relate to data privacy protection, and more specifically, to a method and system for speaker identity and content de-identification under data privacy guarantees.

SUMMARY

One embodiment of the invention provides a method for speaker identity and content de-identification under data privacy guarantees. The method comprises receiving input indicative of at least one level of privacy protection the speaker identity and content re-identification is required to enforce, and extracting features corresponding to a first speaker from a first speech delivered by the first speaker and recorded in a first voice recording. The method further comprises recognizing and extracting textual content from the first speech, parsing the textual content to recognize privacy-sensitive personal information corresponding to a first individual, and generating de-identified textual content by performing utility-preserving content de-identification on the textual content to anonymize the privacy-sensitive personal information to an extent that satisfies the at least one level of privacy protection. The de-identified textual content conceals a personal identity of the first individual. The method further comprises mapping the de-identified textual content to the first speaker, generating a synthetic speaker identity corresponding to the first speaker based on other features corresponding to at least one other speaker, and synthesizing a new speech waveform based on the synthetic speaker identity to deliver the de-identified textual content. The other features corresponding to the at least one other speaker are dissimilar from the features corresponding to the first speaker to an extent that satisfies the at least one level of privacy protection. The new speech waveform is different from a speech waveform of the first speech, and the new speech waveform conceals a personal identity of the first speaker.

Another embodiment of the invention provides a system for speaker identity and content de-identification under data privacy guarantees. The system comprises at least one processor and a non-transitory processor-readable memory device storing instructions that when executed by the at least one processor causes the at least one processor to perform operations. The operations include receiving input indicative of at least one level of privacy protection the speaker identity and content re-identification is required to enforce, and extracting features corresponding to a first speaker from a first speech delivered by the first speaker and recorded in a first voice recording. The operations further include recognizing and extracting textual content from the first speech, parsing the textual content to recognize privacy-sensitive personal information corresponding to a first individual, and generating de-identified textual content by performing utility-preserving content de-identification on the textual content to anonymize the privacy-sensitive personal information to an extent that satisfies the at least one level of privacy protection. The de-identified textual content conceals a personal identity of the first individual. The operations further include mapping the de-identified textual content to the first speaker, generating a synthetic speaker identity corresponding to the first speaker based on other features corresponding to at least one other speaker, and synthesizing a new speech waveform based on the synthetic speaker identity to deliver the de-identified textual content. The other features corresponding to the at least one other speaker are dissimilar from the features corresponding to the first speaker to an extent that satisfies the at least one level of privacy protection. The new speech waveform is different from a speech waveform of the first speech, and the new speech waveform conceals a personal identity of the first speaker.

One embodiment of the invention provides a computer program product for speaker identity and content de-identification under data privacy guarantees. The computer program product comprises a computer readable storage medium having program instructions embodied therewith. The program instructions are executable by a processor to cause the processor to receive input indicative of at least one level of privacy protection the speaker identity and content re-identification is required to enforce, and extract features corresponding to a first speaker from a first speech delivered by the first speaker and recorded in a first voice recording. The program instructions further cause the processor to recognize and extract textual content from the first speech, parse the textual content to recognize privacy-sensitive personal information corresponding to a first individual, and generate de-identified textual content by performing utility-preserving content de-identification on the textual content to anonymize the privacy-sensitive personal information to an extent that satisfies the at least one level of privacy protection. The de-identified textual content conceals a personal identity of the first individual. The program instructions further cause the processor to map the de-identified textual content to the first speaker, generate a synthetic speaker identity corresponding to the first speaker based on other features corresponding to at least one other speaker, and synthesize a new speech waveform based on the synthetic speaker identity to deliver the de-identified textual content. The other features corresponding to the at least one other speaker are dissimilar from the features corresponding to the first speaker to an extent that satisfies the at least one level of privacy protection. The new speech waveform is different from a speech waveform of the first speech, and the new speech waveform conceals a personal identity of the first speaker.

These and other aspects, features and advantages of embodiments of the invention will be understood with reference to the drawing figures, and detailed description herein, and will be realized by means of the various elements and combinations particularly pointed out in the appended claims. It is to be understood that both the foregoing general description and the following brief description of the drawings and detailed description of embodiments of the invention are exemplary and explanatory of preferred embodiments of the invention, and are not restrictive of embodiments of the invention, as claimed.

BRIEF DESCRIPTION OF THE DRAWINGS

The subject matter which is regarded as embodiments of the invention are particularly pointed out and distinctly claimed in the claims at the conclusion of the specification. The foregoing and other objects, features, and advantages of embodiments of the invention are apparent from the following detailed description taken in conjunction with the accompanying drawings in which:

Figure 1:
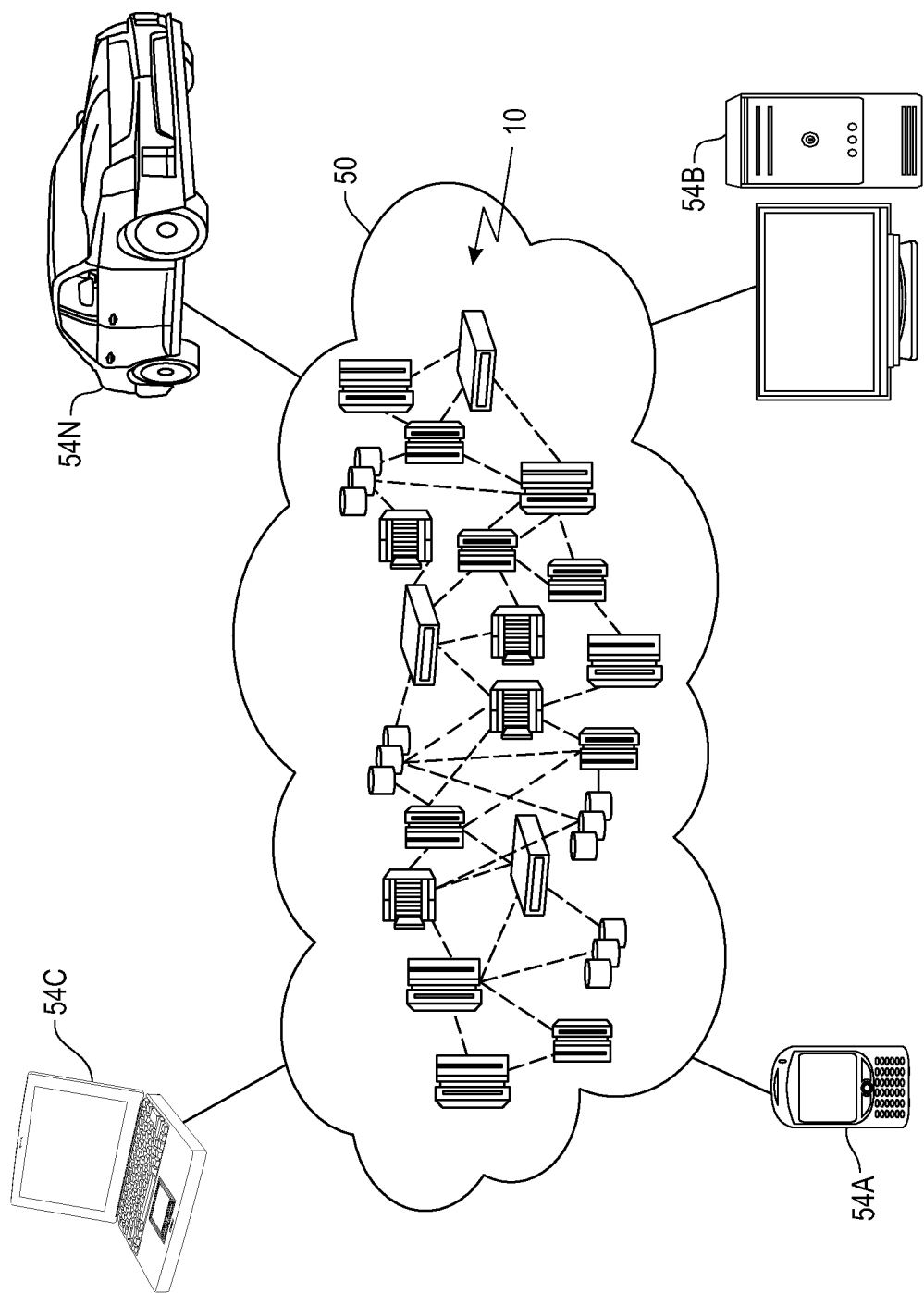
FIG. 1 depicts a cloud computing environment according to an embodiment of the present invention.

The detailed description explains the preferred embodiments of the invention, together with advantages and features, by way of example with reference to the drawings.

DETAILED DESCRIPTION

Embodiments of the invention generally relate to data privacy protection, and more specifically, to a method and system for speaker identity and content de-identification under data privacy guarantees. One embodiment of the invention provides a method for speaker identity and content de-identification under data privacy guarantees. The method comprises receiving input indicative of at least one level of privacy protection the speaker identity and content re-identification is required to enforce, and extracting features corresponding to a first speaker from a first speech delivered by the first speaker and recorded in a first voice recording. The method further comprises recognizing and extracting textual content from the first speech, parsing the textual content to recognize privacy-sensitive personal information corresponding to a first individual, and generating de-identified textual content by performing utility-preserving content de-identification on the textual content to anonymize the privacy-sensitive personal information to an extent that satisfies the at least one level of privacy protection. The de-identified textual content conceals a personal identity of the first individual. The method further comprises mapping the de-identified textual content to the first speaker, generating a synthetic speaker identity corresponding to the first speaker based on other features corresponding to at least one other speaker, and synthesizing a new speech waveform based on the synthetic speaker identity to deliver the de-identified textual content. The other features corresponding to the at least one other speaker are dissimilar from the features corresponding to the first speaker to an extent that satisfies the at least one level of privacy protection. The new speech waveform is different from a speech waveform of the first speech, and the new speech waveform conceals a personal identity of the first speaker.

Another embodiment of the invention provides a system for speaker identity and content de-identification under data privacy guarantees. The system comprises at least one processor and a non-transitory processor-readable memory device storing instructions that when executed by the at least one processor causes the at least one processor to perform operations. The operations include receiving input indicative of at least one level of privacy protection the speaker identity and content re-identification is required to enforce, and extracting features corresponding to a first speaker from a first speech delivered by the first speaker and recorded in a first voice recording. The operations further include recognizing and extracting textual content from the first speech, parsing the textual content to recognize privacy-sensitive personal information corresponding to a first individual, and generating de-identified textual content by performing utility-preserving content de-identification on the textual content to anonymize the privacy-sensitive personal information to an extent that satisfies the at least one level of privacy protection. The de-identified textual content conceals a personal identity of the first individual. The operations further include mapping the de-identified textual content to the first speaker, generating a synthetic speaker identity corresponding to the first speaker based on other features corresponding to at least one other speaker, and synthesizing a new speech waveform based on the synthetic speaker identity to deliver the de-identified textual content. The other features corresponding to the at least one other speaker are dissimilar from the features corresponding to the first speaker to an extent that satisfies the at least one level of privacy protection. The new speech waveform is different from a speech waveform of the first speech, and the new speech waveform conceals a personal identity of the first speaker.

One embodiment of the invention provides a computer program product for speaker identity and content de-identification under data privacy guarantees. The computer program product comprises a computer readable storage medium having program instructions embodied therewith. The program instructions are executable by a processor to cause the processor to receive input indicative of at least one level of privacy protection the speaker identity and content re-identification is required to enforce, and extract features corresponding to a first speaker from a first speech delivered by the first speaker and recorded in a first voice recording. The program instructions further cause the processor to recognize and extract textual content from the first speech, parse the textual content to recognize privacy-sensitive personal information corresponding to a first individual, and generate de-identified textual content by performing utility-preserving content de-identification on the textual content to anonymize the privacy-sensitive personal information to an extent that satisfies the at least one level of privacy protection. The de-identified textual content conceals a personal identity of the first individual. The program instructions further cause the processor to map the de-identified textual content to the first speaker, generate a synthetic speaker identity corresponding to the first speaker based on other features corresponding to at least one other speaker, and synthesize a new speech waveform based on the synthetic speaker identity to deliver the de-identified textual content. The other features corresponding to the at least one other speaker are dissimilar from the features corresponding to the first speaker to an extent that satisfies the at least one level of privacy protection. The new speech waveform is different from a speech waveform of the first speech, and the new speech waveform conceals a personal identity of the first speaker.

For expository purposes, the term "de-identification" generally refers to a process of preventing an individual's personal identity from being revealed. A personal identity of an individual comprises information indicative of one or more private characteristics of the individual (i.e., privacy-sensitive personal information such as, but not limited to, gender, age, health, emotions, education, origin, etc.) A third party may infer an identity of an individual if privacy-sensitive personal information of the individual is revealed to the third party.

For expository purposes, the term "speech data" generally refers to data comprising one or more voice recordings of one or more speeches delivered by one or more speakers.

For expository purposes, the terms "speaker de-identification" and "voice de-identification" generally refer to a process of applying de-identification to speech data including a voice recording of a speech delivered by a speaker to prevent the speaker's personal identity and voice from being revealed.

For expository purposes, the terms "textual content de-identification" and "content de-identification" generally refer to a process of applying de-identification to textual content comprising privacy-sensitive personal information about an individual to prevent the individual's personal identity from being revealed from the textual content.

For expository purposes, the term "speaker identity and content de-identification" generally refers to a process of applying both speaker de-identification and content de-identification to speech data.

For expository purposes, the term "direct identifier" generally refers to a data attribute, a word, a token, or a value that can be used alone to identify an individual. A direct identifier can uniquely correspond to an individual, such that it reveals an identity of the corresponding individual when present in data. Examples of direct identifiers include, but are not limited to, person names, social security numbers, national IDs, credit card numbers, phone numbers, medical record numbers, IP addresses, account numbers, etc.

For expository purposes, the terms "indirect identifier" or "quasi-identifier" generally refers to a data attribute, a word, a token, or a value that cannot be used alone to identify an individual, but can be used in combination with one or more other indirect/quasi-identifiers to identify the individual. A combination of indirect/quasi-identifiers corresponding to an individual can be unique or extremely rare, such that the combination can reveal an identity of the corresponding individual when present in data, or the combination can be linked to the identity of the corresponding individual with a record in an external publicly available data set (e.g., voter registration list, decennial records, U.S. census, etc.) that contains a name of the corresponding individual. Examples of indirect/quasi-identifiers include, but are not limited to, date of birth, gender, zip code, etc. For example, for a large portion of the U.S. population, the combination of date-of-birth, gender, and five-digit zip code is unique.

Embodiments of the invention provide a method and system for voice de-identification and content de-identification of voice recordings that protects personal identities of speakers delivering speeches recorded in the voice recordings as well as privacy-sensitive personal information included in textual content of the speeches.

A speaker giving a speech produces a human voice that carries with it speech signals that are indicative of privacy-sensitive personal information of the speaker. For example, timbre of a speaker's voice typically carries most personal identity information of the speaker. As no two individuals sound identical, a human voice of an individual can be used as an identifier of the individual by combining one or more physiological characteristics of the speaker's vocal tract system (e.g., vocal folds, vocal tract shapes, timbre, pitch, etc.) and/or one or more behavioral characteristics (e.g., rhythm, intonation, vocabulary, accent, pronunciation, talking style, etc.) of the human voice as unique biometric pattern (i.e., signature) for the individual.

With the ubiquitous rise of automatic speaker verification (ASV) systems in recent times, it has become necessary to effectively protect personal identities of speakers in speech data. Further, as a speech can include content that is highly sensitive in nature, privacy protection measures to protect the content is necessary to comply with existing data privacy laws. For example, speech data comprising audio clinical data (e.g., voice recordings of clinicians included in electronic health records (EHRs) and documenting the clinicians' encounters with patients) contains privacy-sensitive personal information, such as protected health information (PHI), about patients; such data must undergo de-identification prior to sharing the data with one or more third parties for secondary use (e.g., sharing to support medical studies).

Conventional solutions for speaker de-identification utilize voice transformation (VT), a technology that modifies original, non-linguistic characteristics of a spoken utterance to anonymize a speaker's speech, without affecting content of the speech. Specifically, VT modifies a voice of a speaker via: (1) source modifications that involve modifying a timescale, pitch, and/or energy of the speaker's voice, (2) filter modifications that involve modifying a timbre (i.e., magnitude response) of the speaker's voice, or (3) a combination of source modifications and filter modifications.

Voice conversion is a special form of VT involving mapping characteristics of a speaker's voice (i.e., a source speaker's voice) to characteristics of another individual's voice (i.e., a target speaker's voice). The source speaker may utilize voice conversion to mimic/imitate the target speaker's voice. Voice conversion requires both a source speaker and a target speaker using the same corpora to produce spoken utterances of the same text for training purposes.

Embodiments of the invention provide a method and system for speaker de-identification that utilizes state-of-the-art feature vector extraction approaches that operate on speech data for ASV to construct or create speaker identities for different individuals, while offering data privacy guarantees. In one embodiment, privacy is protected by controlling textual content of speech data by anonymizing the textual content. Embodiments of the invention provide a novel approach that combines speaker de-identification and textual content de-identification to both conceal an identity of a speaker and anonymize textual content of speech, while offering state-of-the-art data privacy guarantees. This approach can be used in a wide spectrum of real-world applications to effectively and provably anonymize speech data and voice recordings, and facilitate secondary use of the resulting anonymized speech data and voice recordings.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. In one embodiment, this cloud model includes at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and personal digital assistants).

Resource pooling: the provider's computing resources are pooled to serve multiple consumers using a multi-tenant model, with different physical and virtual resources dynamically assigned and reassigned according to demand. In one embodiment, there is a sense of location independence in that the consumer generally has no control or knowledge over the exact location of the provided resources but is able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. In one embodiment, it is managed by the organization or a third party and exists on-premises or off-premises.

Community cloud: the cloud infrastructure is shared by several organizations and supports a specific community that has shared concerns (e.g., mission, security requirements, policy, and compliance considerations). In one embodiment, it is managed by the organizations or a third party and exists on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure that includes a network of interconnected nodes.

FIG. 1 depicts a cloud computing environment 50 according to an embodiment of the present invention. As shown, in one embodiment, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N communicate. In one embodiment, nodes 10 communicate with one another. In one embodiment, they are grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
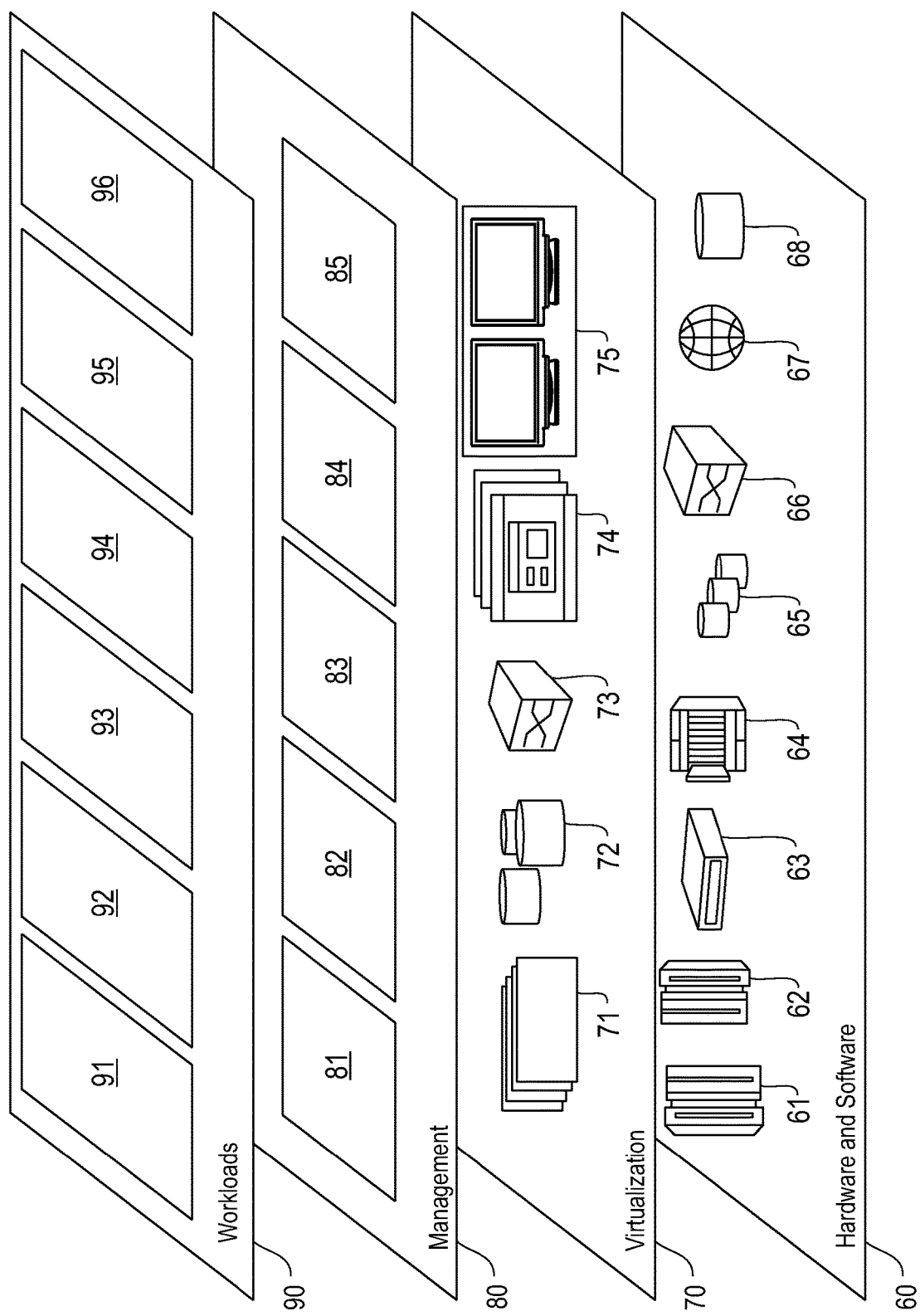
FIG. 2 depicts abstraction model layers according to an embodiment of the present invention.

FIG. 2 depicts a set of functional abstraction layers provided by cloud computing environment 50 according to an embodiment of the present invention. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

In one embodiment, virtualization layer 70 provides an abstraction layer from which the following examples of virtual entities are provided: virtual servers 71; virtual storage 72; virtual networks 73, including virtual private networks; virtual applications and operating systems 74; and virtual clients 75.

In one embodiment, management layer 80 provides the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one embodiment, these resources include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

In one embodiment, workloads layer 90 provides examples of functionality for which the cloud computing environment is utilized. In one embodiment, examples of workloads and functions which are provided from this layer include: mapping and navigation 91; software development and lifecycle management 92; virtual classroom education delivery 93; data analytics processing 94; transaction processing 95; and speaker identity and content de-identification 96 (e.g., a speaker identity and content de-identification system 330, as described in detail later herein).

Figure 3:
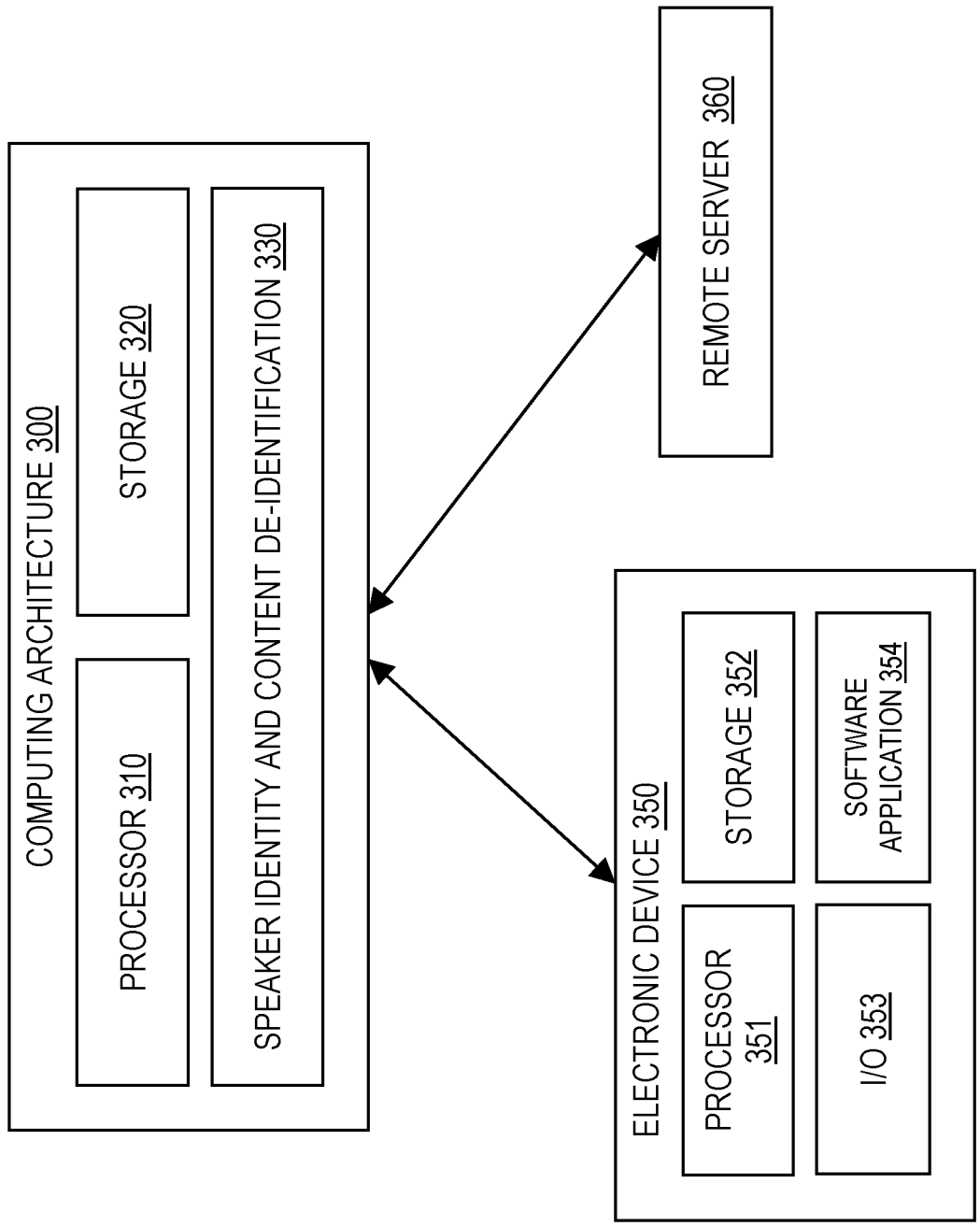
FIG. 3 illustrates an example computing architecture for implementing speaker identity and content de-identification, in accordance with an embodiment of the invention.

FIG. 3 illustrates an example computing architecture 300 for implementing speaker identity and content de-identification, in accordance with an embodiment of the invention. In one embodiment, the computing architecture 300 is a centralized computing architecture. In another embodiment, the computing architecture 300 is a distributed computing architecture.

In one embodiment, the computing architecture 300 comprises computation resources such as, but not limited to, one or more processor units 310 and one or more storage units 320. One or more applications may execute/operate on the computing architecture 300 utilizing the computation resources of the computing architecture 300. In one embodiment, the applications on the computing architecture 300 include, but are not limited to, a speaker identity and content de-identification system 330 configured for speaker identity and content de-identification.

As described in detail later herein, in one embodiment, the system 330 is configured to receive a data set (e.g., a collection of speech data) comprising a set of voice recordings of a set of speakers, wherein textual content of the voice recordings comprise privacy-sensitive personal information about a set of individuals. The system 330 is configured to apply speaker de-identification and content de-identification to at least one of the voice recordings to conceal an identity (i.e., personal identity) of at least one of the speakers and anonymize privacy-sensitive personal information about at least one of the individuals, resulting in at least one de-identified voice recording from which the identity of the at least one speaker and the privacy-sensitive personal information about the at least one individual cannot be inferred. Each resulting de-identified voice recording can be shared with one or more third parties for secondary use (e.g., sharing to support medical studies).

For example, in one embodiment, the data set is audio clinical data comprising voice recordings of clinicians included in EHRs and documenting the clinicians' encounters with patients, wherein textual content of the voice recordings contains PHI about the patients. The system 330 extracts a subset of the audio clinical data (i.e., extracts one or more of the voice recordings), and de-identifies the extracted subset (i.e., applies speaker identity and content de-identification to the extracted voice recordings) to conceal identities of the clinicians and anonymize the PHI about the patients. As privacy-sensitive personal information (e.g., PHI) about the patients cannot be inferred from the resulting de-identified extracted subset (i.e., resulting de-identified voice recordings), the de-identified extracted subset may be shared with one or more third parties to support medical studies.

In one embodiment, the system 330 is incorporated/integrated into a cloud computing environment (e.g., IBM Cloud®, etc.).

In one embodiment, the speaker identity and content de-identification system 330 is configured to exchange data with one or more electronic devices 350 and/or one or more remote server devices 360 over a connection (e.g., a wireless connection such as a Wi-Fi connection or a cellular data connection, a wired connection, or a combination of the two).

In one embodiment, an electronic device 350 comprises one or more computation resources such as, but not limited to, one or more processor units 351 and one or more storage units 352. One or more applications may execute/operate on an electronic device 350 utilizing the one or more computation resources of the electronic device 350 such as, but not limited to, one or more software applications 354 loaded onto or downloaded to the electronic device 350. Examples of software applications 354 include, but are not limited to, artificial intelligence (AI) applications, big data analytics applications, etc.

Examples of an electronic device 350 include, but are not limited to, a desktop computer, a mobile electronic device (e.g., a tablet, a smart phone, a laptop, etc.), a wearable device (e.g., a smart watch, etc.), an Internet of Things (IoT) device, a smart appliance such as a smart television, etc.

In one embodiment, an electronic device 350 comprises one or more input/output (I/O) units 353 integrated in or coupled to the electronic device 350, such as a keyboard, a keypad, a touch interface, a display screen, etc. A user may utilize an I/O unit 353 of an electronic device 350 to configure one or more user preferences, configure one or more parameters (e.g., thresholds, bounds, etc.), provide input (e.g., requests), etc.

In one embodiment, an electronic device 350 and/or a remote server device 360 may be a data source providing a data set for speaker identity and content de-identification.

In one embodiment, the speaker identity and content de-identification system 330 may be accessed or utilized by one or more online services (e.g., AI services, big data analytics services, data processing services) hosted on a remote server device 360 and/or one or more software applications 354 (e.g., AI applications, big data analytics applications, data processing applications) operating on an electronic device 350.

Figure 4:
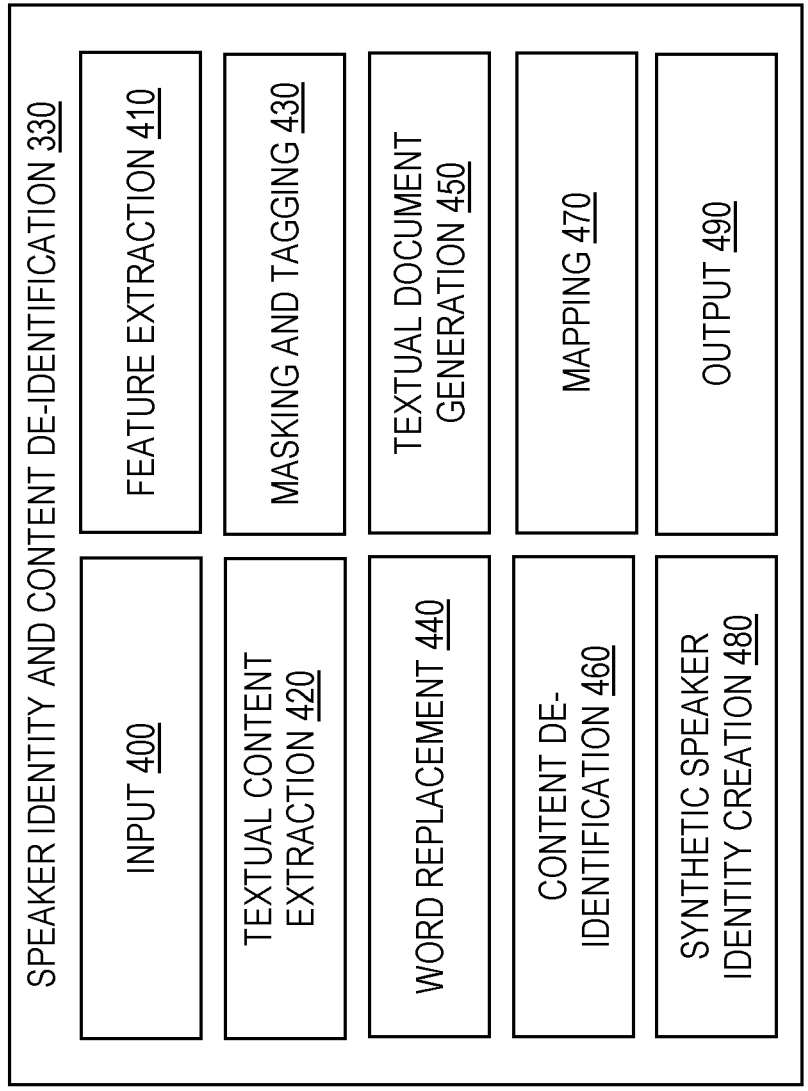
FIG. 4 illustrates an example speaker identity and content de-identification system, in accordance with an embodiment of the invention.

FIG. 4 illustrates an example speaker identity and content de-identification system 330, in accordance with an embodiment of the invention. In one embodiment, the system 330 comprises an input unit 400 configured to receive a dataset comprising a collection of speech data. In one embodiment, the collection of speech data comprises R voice recordings, wherein R is a positive integer. The R voice recordings are original voice recordings of speeches delivered by the S speakers, wherein S is a positive integer. Specifically, for each of the S speakers, the R voice recordings comprise at least one corresponding voice recording of at least one speech delivered by the speaker. Textual content of the speeches delivered by the S speakers comprise privacy-sensitive personal information, such as PHI or other personally identifiable information (PII), about (i.e., concerning or involving) P individuals, wherein P is a positive integer.

In one embodiment, the system 330 comprises a feature extraction unit 410. For each of the S speakers, the feature extraction unit 410 is configured to generate a corresponding feature vector based on at least one voice recording (of the R voice recordings) corresponding to the speaker. Specifically, in one embodiment, the feature extraction unit 410 is configured to: (1) for each of the R voice recordings, extract linguistic and speaker identity features from the voice recording (i.e., the features are extracted from speech recorded in the voice recording), and (2) for each of the S speakers, generate a corresponding feature vector based on linguistic and speaker identity features extracted from all voice recordings corresponding to the speaker. For example, if the R voice recordings comprise two voice recordings that both correspond to the same speaker, the feature extraction unit 410 generates a feature vector corresponding to the speaker based on linguistic and speaker identity features extracted from speeches recorded in the two voice recordings.

Examples of linguistic and speaker identity features extracted from a voice recording corresponding to a speaker include, but are not limited to, one or more physiological characteristics of the speaker's vocal tract system (e.g., vocal folds, vocal tract shapes, timbre, pitch, etc.), one or more behavioral characteristics (e.g., rhythm, intonation, vocabulary, accent, pronunciation, talking style, etc.) of the speaker's voice.

In one embodiment, the feature extraction unit 410 generates a feature vector corresponding to a speaker by training the feature vector based on linguistic and speaker identity features extracted from all voice recordings corresponding to the speaker.

In one embodiment, the feature extraction unit 410 utilizes a feature vector extraction approach such as, but not limited to, x-vectors, i-vectors, etc. In another embodiment, the feature extraction unit 410 utilizes Fourier or Fast Fourier Transform (FFT) to disaggregate unique tones of the S speakers and separate voice prints of the S speakers. Unique speakers may be split into separate speech files for processing.

In one embodiment, all feature vectors generated by the feature extraction unit 410 are maintained in a database (e.g., on the storage unit 320).

In one embodiment, the system 330 comprises a textual content extraction unit 420. For each of the R voice recordings, the textual content extraction unit 420 is configured to recognize and extract textual content (i.e., a transcript) from the voice recording (i.e., the textual content is extracted from speech recorded in the voice recording), wherein the textual content comprises words (or terms) spoken or uttered by a speaker who the voice recording corresponds to (and who delivered the speech). In one embodiment, the textual content extraction unit 420 recognizes and extracts textual content from a voice recording utilizing a speech recognition approach or engine such as, but not limited to, Dragon®, IBM® Speech to Text, Temi, Transcribe, etc.

In one embodiment, for each of the R voice recordings, the textual content extraction unit 420 is optionally configured to generate corresponding annotated text based on textual content recognized and extracted from the voice recording, wherein the annotated text is an annotation providing a mapping between a speech waveform of the voice recording and words (or terms) spoken or uttered by a speaker who the voice recording corresponds to.

In one embodiment, the textual content extraction unit 420 is configured to link a speech waveform of a voice recording with a segment (i.e., portion) of textual content recognized and extracted from the voice recording, wherein the segment comprises privacy-sensitive personal information (e.g., PHI or other PII) about one of the P individuals. In one embodiment, the segment is pre-filtered to obfuscate the segment before speaker identity and content de-identification of the voice recording is completed. In one embodiment, the speech waveform is flagged or marked to identify the voice recording as one of the R voice recordings that cannot be released or disclosed to a third party for secondary use without inspection (e.g., the voice recording must undergo speaker identity and content de-identification before release).

In one embodiment, the system 330 comprises a masking and tagging unit 430. For each of the R voice recordings, the masking and tagging unit 430 is configured to generate corresponding processed textual content by recognizing and processing privacy-sensitive personal information (e.g., PHI or other PII) contained in textual content recognized and extracted from the voice recording. Specifically, for each of the R voice recordings, the masking and tagging unit 430 is configured to: (1) receive textual content recognized and extracted from the voice recording (e.g., from the textual content extraction unit 420), (2) parse the textual content utilizing at least one natural language processing (NLP) annotator to recognize (i.e., find) at least one direct identifier and/or at least one quasi-identifier in the textual content, and (3) process each identifier (i.e., direct identifier and/or quasi-identifier) recognized in the textual content based on a type of the identifier, resulting in processed textual content that corresponds to the voice recording.

For expository purposes, the term "PII word" generally refers to a word (or term) in textual content that is either a direct identifier or a quasi-identifier. For expository purposes, the term "non-PII word" generally refers to a word (or term) in textual content that is neither a direct identifier nor a quasi-identifier. Non-PII words cannot be linked to an individual's personal identity.

In one embodiment, the masking and tagging unit 430 processes a direct identifier recognized in textual content by masking (i.e., replacing) the direct identifier in the textual content with a masked value (i.e., replacement value) that is based on a type of the direct identifier. For example, in one embodiment, if the direct identifier recognized in the textual content is a name, the masking and tagging unit 430 replaces the direct identifier in the textual content with a random name (e.g., extracted from a dictionary, extracted from a publicly available dataset such as a voters' registration list, etc.) or a pseudonym (e.g., "Patient1234"). Alternatively, the masking and tagging unit 430 processes a direct identifier recognized in textual content by suppressing the direct identifier from the textual content.

In one embodiment, the masking and tagging unit 430 processes a quasi-identifier recognized in textual content by tagging the quasi-identifier with one or more tags that are based on a type of the quasi-identifier (e.g., age, gender, date, zip code, etc.). For example, in one embodiment, if the quasi-identifier recognized in the textual content is an age, the masking and tagging unit 430 is configured to tag the quasi-identifier with one or more tags that indicate the quasi-identifier is an age.

In one embodiment, if a segment (i.e., portion) of textual content contains an unidentified concept (e.g., not recognized by a NLP annotator) or unintelligible audio, the masking and tagging unit 430 is configured to annotate or mark the segment as "unknown", such that the segment is ignored for further processing by the system 330.

A speaker's choice of words (i.e., word choice) may be characteristic of the speaker's identity and may reveal the speaker's identity. In one embodiment, the system 330 comprises a word replacement unit 440. For each of the R voice recordings, the word replacement unit 440 is configured to replace some words in corresponding processed textual content with similar words to protect word choices of a speaker who the voice recording corresponds to. Specifically, for each of the R voice recordings, the word replacement unit 440 is configured to: (1) receive processed textual content corresponding to the voice recording (e.g., from the masking and tagging unit 430), (2) select at least one word in the processed textual content that is either a quasi-identifier or a non-PII word, and (3) replace each selected word with a similar (i.e., synonymous) word utilizing a thesaurus, a lookup table, or a lexical database (e.g., Wordnet). In one embodiment, if the processed textual content comprises healthcare terminology (e.g., the speech data is audio clinical data), the word replacement unit 440 may replace a medical term in the processed textual content with a SNOMED (systematically organized computer processable collection of medical terms) code or an ICD-9 (International Classification of Disease, Ninth Revision) code that the medical term maps to.

In one embodiment, for each of the S speakers, similar words used as replacements are the same (i.e., global) across all processed textual content corresponding to the same speaker (i.e., all processed textual content corresponding to all voice recordings that correspond to the same speaker), thereby protecting an identity of the speaker and also preserving utility of all the processed textual content. For example, in one embodiment, the word replacement unit 440 may replace each occurrence of the word "found" in all the processed textual content with the same similar word "discovered", and may replace each occurrence of the word "elevated" in all the processed textual content with the same similar word "increased" (i.e., the same similar words are used across all the processed textual content).

In one embodiment, the system 330 comprises a textual document generation unit 450. For each of the P individuals, the textual document generation unit 450 is configured to generate a corresponding textual document by combining all processed textual content corresponding to the same individual (i.e., all processed textual content comprising privacy-sensitive personal information about the same individual). Specifically, in one embodiment, for each of the P individuals, the textual document generation unit 450 is configured to: (1) receive all processed textual content corresponding to the same individual (e.g., from the masking and tagging unit 430 and/or the word replacement unit 440), wherein all the processed textual content comprises privacy-sensitive personal information about the individual that has been masked, replaced, suppressed, and/or tagged, and (2) generate a corresponding textual document by combining all of the processed textual content into the textual document.

In one embodiment, the textual document generation unit 450 generates a corresponding textual document for each of the P individuals, resulting in a collection of P textual documents generated in total. In one embodiment, the collection of P textual documents is maintained in a database (e.g., on the storage unit 320). Alternatively, in one embodiment, the textual document generation unit 450 generates a corresponding textual document only for individuals who have multiple corresponding processed textual contents (i.e., only for individuals who are a subject of multiple voice recordings).

In one embodiment, if an individual is a subject of multiple voice recordings (i.e., all processed textual content corresponding to the multiple voice recordings comprises privacy-sensitive personal information about the individual), the textual document generation unit 450 is configured to federate all processed textual content corresponding to the multiple voice recordings into a corresponding textual document based on a timestamp vector or categorical similarity. For example, in one embodiment, all the processed textual content is arranged in the textual document in a chronological order based on the timestamp vector indicative of timestamps of the multiple voice recordings. As another example, in one embodiment, all the processed textual content is arranged in the textual document in order of categorical similarity.

In one embodiment, the system 330 comprises a content de-identification unit 460. For each of the P individuals, the content de-identification unit 460 is configured to: (1) receive a corresponding textual document (e.g., from the textual document generation unit 450), wherein the textual document comprises all processed textual content corresponding to the same individual (i.e., all the processed textual content comprises privacy-sensitive personal information about the individual that has been masked, replaced, suppressed, and/or tagged), and (2) generate corresponding de-identified textual content by applying content de-identification to the textual document. The content de-identification applied anonymizes all the processed textual content included the textual document to an extent that preserves utility of all the processed textual content and does not reveal any privacy-sensitive personal information about the individual. All de-identified textual content generated by the content de-identification unit 460 is suitable for release to a third party for secondary use.

In one embodiment, for each of the P individuals, the content de-identification unit 460 is configured to generate corresponding de-identified textual content that protects the individual among $k_c$ other individuals from the P individuals, wherein $k_c \le P$. These conditions provide data privacy guarantees on potential re-identification (by a third party) of the original identity of the individual. If the corresponding de-identified textual content is released to, or intercepted by, a third party, a probability of the third party successfully identifying the individual (i.e., inferring an identity of the individual) from the de-identified textual content is bounded by $1/k_c$. Therefore, a likelihood of the third party (e.g., an attacker) performing a successful re-identification of the individual from the de-identified textual content is bounded by $1/k_c$. In one embodiment, $k_c$ is set by a data owner or a de-identification expert (e.g., via an I/O unit 353). In one embodiment, $k_c$ is a re-identification risk threshold provided as input by a data owner or a de-identification expert, and used to enforce a required/necessary level of privacy protection (i.e., likelihood of re-identification).

In one embodiment, the content de-identification applied by the content de-identification unit 460 comprises the following steps: First, the content de-identification unit 460 parses each of the P textual documents to produce a union of terms/tokens that appear in the textual document and that exclude each PII word recognized (i.e., each direct identifier and/or quasi-identifier recognized via the masking and tagging unit 430). The content de-identification unit 460 maintains a term frequency list comprising, for each term/token of the union, a corresponding frequency indicative of a number of times the term/token appears (i.e., occurs) across the P textual documents.

Second, the content de-identification unit 460 selects one or more infrequent terms in the P textual documents for pruning based on at least one blacklist/dictionary for direct identifiers (e.g., a list of names extracted from a publicly available dataset such as a voters' registration list). In one embodiment, the content de-identification unit 460 utilizes the at least one blacklist/dictionary to determine a maximum frequency F associated with a direct identifier recognized in the P textual documents, wherein the maximum frequency F is selected as a threshold for use in selecting infrequent terms in the P textual documents for pruning. For example, in one embodiment, the content de-identification unit 460 selects for pruning all terms/tokens of the union with corresponding frequencies that do not exceed the threshold F, such that remaining terms/tokens of the union not selected for pruning have corresponding frequencies that exceed the threshold F.

For each infrequent term/token selected for pruning, the content de-identification unit 460 is configured to prune (i.e., filter out) the infrequent term/token from the P textual documents.

The content de-identification unit 460 selects unique terms and low-frequency terms (collectively, infrequent terms) occurring in the P textual documents for pruning. The content de-identification unit 460 initially assumes each infrequent term selected for pruning is a PII word. However, an infrequent term selected for pruning may actually be a non-PII word that need not be pruned (i.e., filtered out) from the P textual documents. Third, to account for infrequent terms that are actually non-PII words, the content de-identification unit 460 is optionally configured to reinstate one or more infrequent terms selected for pruning to the P textual documents based on at least one whitelist of innocuous terms. Each infrequent term selected for pruning but included in the at least one whitelist is recognized by the content de-identification unit 460 as a known non-PII word and reinstated to the P textual documents. Examples of whitelists the content de-identification unit 460 may utilize include, but are not limited to, known whitelists for content de-identification, lexical databases (e.g., Wordnet).

Fourth, the content de-identification unit 460 is configured to extract each quasi-identifier recognized in the P textual documents and create a corresponding record of structured data (i.e., structured representation) based on a list of known quasi-identifiers. The list of known quasi-identifiers identifies one or more structured representations for maintaining one or more values for one or more known types of quasi-identifiers. For example, if the list of known quasi-identifiers is defined as {date of birth, gender, 5-digit zip code}, the list identifies a first structured representation for maintaining a value for the known type date of birth, a second structured representation for maintaining a value for the known type gender, and a third structured representation for maintaining a value for the known type 5-digit zip code. In one embodiment, the list of known quasi-identifiers is derived based on publicly available datasets in the domain that the textual documents are in (i.e., pertain to). In another embodiment, the list of known quasi-identifiers is provided by a data owner or a de-identification expert (e.g., via an I/O unit 353).

Specifically, for each known type included in the list of known quasi-identifiers, the content de-identification unit 460 is configured to: (1) locate all textual documents in the P textual documents that contain at least one quasi-identifier tagged with one or more tags that indicate the known type, and (2) for each textual document located, create a corresponding record of structured data maintaining a value for the known type. For example, if the known type is date of birth and the quasi-identifier is "Nov. 2, 1980", the record created comprises the following structured data: date of birth="11/2/1980". As another example, if the known type is gender and the quasi-identifier is "he", the record created comprises the following structured data: gender="M". As yet another example, if the known type is zip code and the quasi-identifier is "12345", the record created comprises the following structured data: zip code="12345".

In one embodiment, the content de-identification unit 460 suppresses each quasi-identifier in the P textual documents that is tagged with one or more tags that indicate a type of quasi-identifier not included in the list of known quasi-identifiers.

In one embodiment, the content de-identification unit 460 supports a plurality of anonymization algorithms. For each record of structured data created, the content de-identification unit 460 is configured to select, among the plurality of anonymization algorithms, an appropriate syntactic anonymization approach (i.e., algorithm) to apply to the record to anonymize at least one value maintained in the record, resulting in an anonymized record of structured data maintaining an anonymized value. In one embodiment, for a known type included in the list of quasi-identifiers, the content de-identification unit 460 is optionally configured to apply a micro-aggregation approach to all records of structured data maintaining values for the known type, resulting in anonymized records of structured data maintaining random values for the known type, wherein the random values are computed over a micro-aggregate. For each of the P textual documents, the content de-identification unit 460 is configured to replace each quasi-identifier recognized in the textual document with an anonymized/random value for a known type of the quasi-identifier, wherein the anonymized/random value is obtained from an anonymized record of structured data corresponding to the textual document.

Finally, for each of the P individuals, the content de-identification unit 460 is configured to remove from a corresponding textual document each tag that each quasi-identifier recognized in the textual document is tagged with (e.g., remove start and end tags), resulting in corresponding de-identified textual content.

In one embodiment, the system 330 comprises a mapping unit 470. For each of the P individuals, the mapping unit 470 is configured to: (1) receive corresponding de-identified textual content (e.g., from the content de-identification unit 460), and (2) based on the R voice recordings, map one or more segments of the de-identified textual content to both one or more speakers of the S speakers and one or more speeches delivered by the one or more speakers, wherein the one or more speeches include privacy-sensitive personal information about the individual (i.e., the one or more speeches are recorded in one or more voice recordings that the individual is a subject of).

In one embodiment, the system 330 comprises a synthetic speaker identity creation unit 480. For each of the S speakers, the synthetic speaker identity creation unit 480 is configured to apply speaker de-identification to each voice recording (of the R voice recordings) that corresponds to the speaker. In one embodiment, for each of the S speakers, the speaker de-identification applied by the synthetic speaker identity creation unit 480 comprises: (1) generating a corresponding synthetic speaker identity, and (2) for each voice recording (of the R voice recordings) that corresponds to the speaker, synthesizing a new speech waveform based on the synthetic speaker identity to deliver a de-identified textual content mapped to both the speaker and a speech delivered by the speaker (and recorded in the voice recording). The new speech waveform sounds very different from a speech waveform of each voice recording that corresponds to the speaker. In one embodiment, if the de-identified textual content comprises one or more suppressed values, each suppressed value is articulated/produced as, or translated to, a beep sound in the new speech waveform. A beep sound may notify a listener of the new speech waveform that there are one or more missing words.

In one embodiment, for each of the S speakers, the synthetic speaker identity creation unit 480 is configured to generate a corresponding synthetic speaker identity that satisfies the following conditions: (1) the synthetic speaker identity protects the speaker among $k_s$ other speakers from the S speakers, wherein $k_s \leq S$, and (2) the synthetic speaker identity lies far from an original speaker identity of the speaker (i.e., a new speech waveform synthesized using the synthetic speaker identity sounds very different from a speech waveform of each voice recording that corresponds to the speaker). These conditions provide data privacy guarantees on potential re-identification (by a third party) of the original speaker identity of the speaker. If a de-identified voice recording comprising a new speech waveform synthesized using the synthetic speaker identity is released to, or intercepted by, a third party, a probability of the third party successfully identifying the speaker (i.e., inferring the original speaker identity of the speaker) from the de-identified voice recording is bounded by $1/k_s$. Therefore, a likelihood of the third party (e.g., an attacker) performing a successful re-identification of the speaker from the de-identified voice recording is bounded by $1/k_s$. In one embodiment, $k_s$ is set by a data owner or a de-identification expert (e.g., via an I/O unit 353). In one embodiment, $k_s$ is a re-identification risk threshold provided as input by a data owner or a de-identification expert, and used to enforce a required/necessary level of privacy protection (i.e., likelihood of re-identification).

In one embodiment, the synthetic speaker identity creation unit 480 clusters the S speakers into clusters (i.e., groups) by clustering each feature vector (extracted via the feature extraction unit 410) corresponding to each of the S speakers based on a vector similarity measure/metric (e.g., Euclidean distance or cosine similarity measure), wherein each resulting cluster comprises feature vectors corresponding to at least $k_s$ similar speakers from the S speakers. For each of the S speakers, the synthetic speaker identity creation unit 480 is configured to generate a corresponding synthetic speaker identity by: (1) selecting a cluster (i.e., target cluster) that lies as far as possible from another cluster (i.e., source cluster) that includes a feature vector corresponding to the speaker (i.e., speech waveforms of all feature vectors included in the selected cluster sound very different from a speech waveform of each voice recording corresponding to the speaker), (2) applying an aggregation function over speaker identity features (i.e., speech waveforms) of all feature vectors included in the selected cluster, and (3) generating the synthetic speaker identity based on resulting aggregated speaker identity features. The feature vectors included in the selected cluster are dissimilar from the feature vector corresponding to the speaker to an extent that satisfies a required/necessary level of privacy protection.

In one embodiment, the system 330 comprises an output unit 490. For each of the R original voice recordings, the output unit 490 is configured to release a corresponding de-identified voice recording to a third party for secondary use, wherein the de-identified voice recording comprises a synthesized speech waveform delivering de-identified textual content mapped to both a speaker who corresponds to the original voice recording and a speech delivered by the speaker and recorded in the original voice recording. The output unit 490 releases de-identified information only, i.e., the de-identified voice recording and the de-identified textual content. The output unit 490 does not release the original voice recording or original textual content recognized and extracted from the original voice recording.

In one example application scenario, assume R=10, S=6, and P=20. The R voice recordings comprise ten voice recordings in total, i.e., Voice Recording 1, Voice Recording 2, . . . , and Voice Recording 10. The S speakers comprise six speakers in total, i.e., Speaker 1, Speaker 2, . . . , and Speaker 6. The P individuals comprise twenty individuals in total, i.e., Individual 1, Individual 2, . . . , and Individual 20. In one embodiment, for each of the six speakers, the feature extraction unit 410 generates a corresponding feature vector based on all linguistic and speaker identity features extracted from all voice recordings (of the ten voice recordings) that correspond to the speaker, and maintains the feature vector in a database (e.g., on a storage unit 320).

Assume the system 330 receives a request, via the input unit 400, to apply speaker de-identification and content de-identification to three (3) given voice recordings from the ten voice recordings. Assume the three given voice recordings correspond to two particular speakers from the six speakers, and textual content recognized and extracted from the three voice recordings comprise privacy-sensitive personal information about three particular individuals from the twenty individuals.

Table 1 below provides example transcripts recognized and extracted from the three given voice recordings by the textual content extraction unit 420.

TABLE 1

Transcript of Voice Recording 1 (Speaker 1: Dudley, Carmen, M.D.)
Jane Alan ID43729 is a 70-year-old woman with a history of a left renal mass who presented for laparoscopic partial nephrectomy. She was admitted on Aug. 15, 2013 and discharged on Aug. 17, 2013. She was instructed to follow up with Dr. Becket.
Transcript of Voice Recording 2 (Speaker 1: Dudley, Carmen, M.D.)
Mr. Ted Borret ID53265 is 65 years old. He was admitted on Aug. 16, 2013 to evaluate for weakness and balance issues. His blood pressure was found low and was instructed to rest. He was discharged on Aug. 16, 2013. He was given no prescription.
Transcript of Voice Recording 3 (Speaker 2: Bob, Veep, M.D.)
Cathie Trian ID54355 is a 68 years old female with Crohn's disease. Attended cycling event and experienced breathing difficulties. Went to the emergency department and elevated heart enzymes were found. Was admitted on Aug. 14, 2013 to the ICU for care of pneumonia and discharged on Aug. 17, 2013. She was instructed to follow up with Dr. Boris.

As shown in Table 1, the three given voice recordings include: (1) Voice Recording 1 that corresponds to Speaker 1 who is a clinician Carmen Dudley, M.D., wherein a transcript recognized and extracted from Voice Recording 1 comprises privacy-sensitive personal information (e.g., PHI or other PII) about an individual Jane Alan who is a patient, (2) Voice Recording 2 that corresponds to Speaker 1 (i.e., the clinician Carmen Dudley, M.D.), wherein a transcript recognized and extracted from Voice Recording 2 comprises privacy-sensitive personal information about an individual Mr. Ted Borret who is a patient, and (3) Voice Recording 3 that corresponds to Speaker 2 who is a clinician Veep Bob, M.D., wherein a transcript recognized and extracted from Voice Recording 3 comprises privacy-sensitive personal information about an individual Cathie Trian who is a patient.

Figure 5:
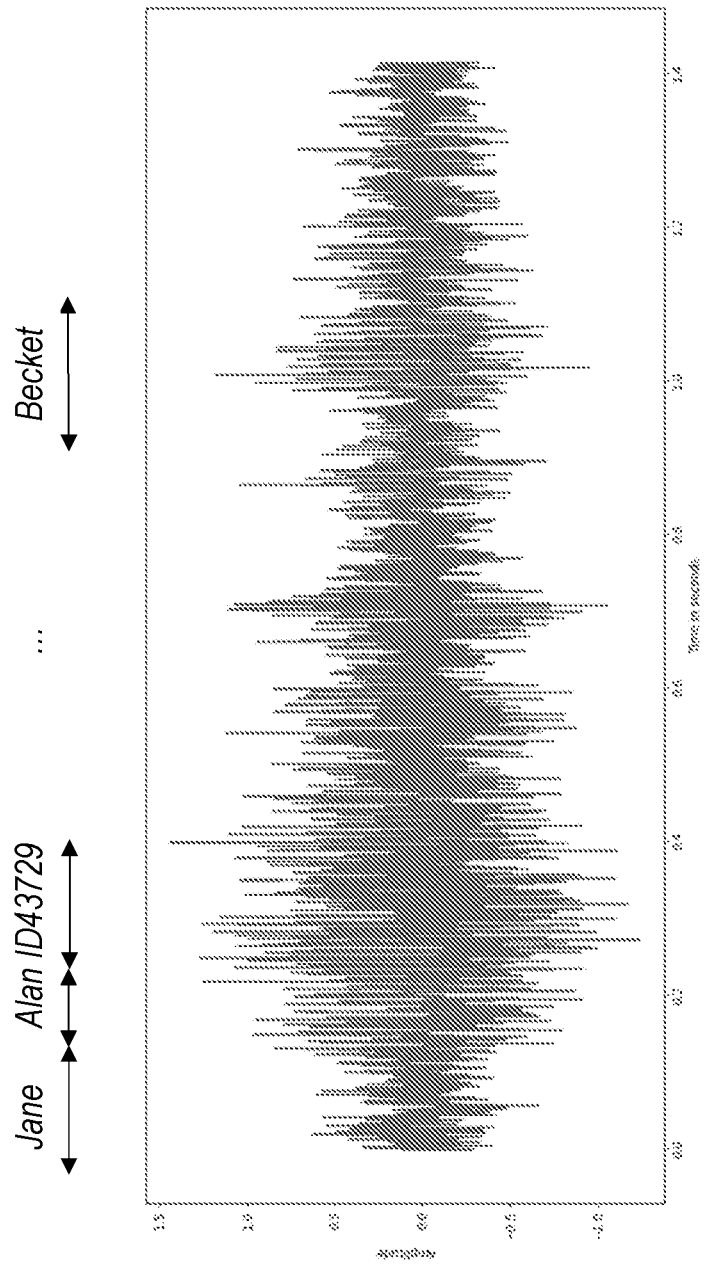
FIG. 5 illustrates an example annotation providing a mapping between a speech waveform of a voice recording and words spoken by a speaker who the voice recording corresponds to, in accordance with an embodiment of the invention.

FIG. 5 illustrates an example annotation providing a mapping between a speech waveform of a voice recording and words spoken by a speaker who the voice recording corresponds to, in accordance with an embodiment of the invention. Specifically, the annotation provides a mapping between a speech waveform of Voice Recording 1 and the transcript recognized and extracted from Voice Recording 1 (see Table 1). The annotation is generated by the textual content extraction unit 420.

Table 2 below provides example direct identifiers and quasi-identifiers recognized in the transcripts of Table 1 by the masking and tagging unit 430. For reference, each direct identifier recognized by the masking and tagging unit 430 is shown in bold with underlining, and each quasi-identifier recognized by the masking and tagging unit 430 is shown in bold with tags that indicate a type of the quasi-identifier.

As shown in Table 2, names in the transcripts are recognized as direct identifiers (e.g., the names "Jane Alan", "Becket", "Ted Borret", "Cathie Trian", and "Boris" are shown in bold with underlining). As further shown in Table 2, one or more words (or terms) in the transcripts that are indicative of a particular age, a particular gender, a particular date, a particular diagnosis, or a particular procedure are recognized as quasi-identifiers (e.g., the date "Aug. 14, 2013" in the transcript recognized and extracted from Voice Recording 3 is tagged with a start tag <date> and an end tag </date>).

As further shown in Table 2, one or more NLP annotators applied to the transcripts are not able to recognize all direct identifiers and/or all quasi-identifiers in the text. For example, direct identifiers "ID43729" and "ID53265" and quasi-identifiers like "Crohn's disease" are not recognized by the NLP annotators. The system 330 is configured to conceal direct identifiers and quasi-identifiers in the transcripts that are not recognized by NLP annotators (e.g., "ID . . . "). For example, the content de-identification unit 460 selects unique terms and low-frequency terms (e.g., "ID . . . ") occurring in the transcripts for pruning (see Table 4 below).

Table 3 below provides example masked values that the masking and tagging unit 430 uses to replace direct identifiers recognized in the transcripts of Table 2 with, and further provides example similar words the word replacement unit 440 uses to replace some words in the transcripts of Table 2 with. For reference, each masked value is shown in bold with underlining, and each similar word is shown in bold and italics.

TABLE 2

Transcript of Voice Recording 1 (Speaker: Dudley, Carmen, M.D.)
Jane Alan ID43729 is a <age>70-year-old</age> <gender>woman</gender> with a history of a <diagnosis> left renal mass </diagnosis> who presented for <procedure>laparoscopic partial nephrectomy</procedure>. <gender>She</gender> was admitted on <date>Aug. 15, 2013</date> and discharged on <date>Aug. 17, 2013</date>. <gender>She</gender> was instructed to follow up with Dr. Becket.
Transcript of Voice Recording 2 (Speaker: Dudley, Carmen, M.D.)
<gender>Mr.</gender> Ted Borret ID53265 is <age>65 years old</age>. <gender>He</gender> was admitted on <date>Aug. 16, 2013</date> to evaluate for <diagnosis>weakness and balance issues</diagnosis>. <gender>His</gender> blood pressure was found low and was instructed to rest. <gender>He</gender> was discharged on <date>Aug. 16, 2013</date>. <gender>He</gender> was given no prescription.
Transcript of Voice Recording 3 (Speaker: Bob, Veep, M.D.)
Cathie Trian ID 54355 is a <age>68 years old</age> <gender>female</gender> with Crohn's disease. Attended cycling event and experienced breathing difficulties. Went to the emergency department and elevated heart enzymes were found. Was admitted on <date>Aug. 14, 2013</date> to the ICU for care of <diagnosis>pneumonia</diagnosis> and discharged on <date>Aug. 17, 2013</date>. <gender>She</gender> was instructed to follow up with Dr. Boris.

TABLE 3

Transcript of Voice Recording 1 (Speaker 1: Dudley, Carmen, M.D.)
Mary Quinn ID43729 is a <age>70-year-old</age> <gender>woman</gender> with a history of a <diagnosis> left renal mass </diagnosis> who came for <procedure>laparoscopic partial nephrectomy</procedure>. <gender>She</gender> was admitted on <date>Aug. 15, 2013</date> and discharged on <date>Aug. 17, 2013</date>. <gender>She</gender> was asked to follow up with Dr. Capeman.
Transcript of Voice Recording 2 (Speaker 1: Dudley, Carmen, M.D.)
<gender>Mr.</gender> Albert Somaya ID53265 is <age>65 years old</age>. <gender>He</gender> was admitted on <date>Aug. 16, 2013</date> to evaluate for <diagnosis>weakness and balance issues</diagnosis>. <gender>His</gender> blood pressure was found low and was asked to rest. <gender>He</gender> was discharged on <date>Aug. 16, 2013</date>. <gender>He</gender> was given no prescription.
Transcript of Voice Recording 3 (Speaker 2: Bob, Veep, M.D.)
Ted Burner ID54355 is a <age>68 years old</age> <gender>female</gender> with Crohn's disease. Attended cycling event and had breathing difficulties. Went to the emergency department and increased heart enzymes were found. Was admitted on <date>Aug. 14, 2013</date> to the ICU for care of <diagnosis>pneumonia</diagnosis> and discharged on <date>Aug. 17, 2013</date>. <gender>She</gender> was instructed to follow up with Dr. Rott.

As shown in Table 3, the names "Jane Alan", "Becket", "Ted Borret", "Cathie Trian", and "Boris" recognized in the transcripts of Table 2 as direct identifiers are replaced with the masked values "Mary Quinn", "Capeman", "Albert Somaya", "Ted Burner", and "Rott", respectively. As further shown in Table 3, each occurrence of the words "presented", "instructed", "experienced", and "elevated" in the transcripts of Table 2 are replaced with the similar words "came", "asked", "had", and "increased", respectively.

Table 4 below provides an example union of terms/tokens produced by the content de-identification unit 460. For reference, each infrequent term/token selected for pruning by the content de-identification unit 460 is shown with strikethrough.

TABLE 4

| a | ~~cycling~~ | ~~event~~ | ~~id43729~~ | ~~of~~ | the | ~~heart~~ |
|---|---|---|---|---|---|---|
| admitted | ~~department~~ | ~~had~~ | ~~id53265~~ | on | to | ~~enzymes~~ |
| and | ~~difficulties~~ | follow | ~~id54355~~ | physician | up | ~~instructed~~ |
| attended | discharged | for | asked | ~~increased~~ | was | |
| ~~blood~~ | ~~disease~~ | ~~found~~ | is | ~~prescription~~ | ~~went~~ | |
| ~~breathing~~ | dr. | ~~given~~ | ~~low~~ | ~~came~~ | ~~were~~ | |
| ~~care~~ | ~~emergency~~ | ~~history~~ | m.d. | ~~pressure~~ | ~~who~~ | |
| ~~Crohn's~~ | ~~evaluate~~ | ~~icu~~ | ~~no~~ | ~~rest~~ | with | |

Table 5 below provides example infrequent terms/tokens selected for pruning but subsequently recognized as innocuous and reinstated by the content de-identification unit 460. For reference, each infrequent term/token subsequently recognized as innocuous and reinstated by the content de-identification unit 460 is shown in bold.

TABLE 5

| a | ~~cycling~~ | event | ~~id43729~~ | of | the | ~~heart~~ |
|---|---|---|---|---|---|---|
| admitted | department | had | ~~id53265~~ | on | to | ~~enzymes~~ |
| and | ~~difficulties~~ | follow | ~~id54355~~ | physician | up | instructed |
| attended | discharged | for | asked | ~~increased~~ | was | |
| ~~blood~~ | ~~disease~~ | found | is | prescription | went | |
| ~~breathing~~ | dr. | given | ~~low~~ | came | were | |
| care | ~~emergency~~ | history | m.d. | ~~pressure~~ | who | |
| ~~Crohn's~~ | evaluate | ~~icu~~ | no | ~~rest~~ | with | |

As shown in Table 5, the infrequent terms "care", "department", "evaluate", "found", "had", "found", "given", "history", "no", "of", "prescription", "came", "went", "were", "who", and "instructed" selected for pruning (see Table 4) are subsequently recognized as innocuous and reinstated.

Let PLQ generally denote a list of known quasi-identifiers. In one example, assume the PLQ is represented in accordance with listing (1) provided below:

$$PLQ=\{\{age, gender\},\{dates\},\{diagnoses\}\} \quad (1),$$

wherein the PLQ comprises the following elements: (1) a first element ("PLQ Element 1") representing a first structured representation {age, gender} for maintaining values for the known types of quasi-identifiers age and gender, (2) a second element ("PLQ Element 2") representing a second structured representation {dates} for maintaining a value for the known type dates, and (3) a third element ("PLQ Element 3") representing a third structured representation {diagnoses} for maintaining a value for the known type diagnosis.

Table 6 below provides example quasi-identifiers extracted from the transcripts of Table 2 by the content de-identification unit. For reference, each quasi-identifier suppressed in the transcripts by the content de-identification unit 460 is shown with strikethrough.

TABLE 6

Transcript of Voice Recording 1 (Speaker 1: Dudley, Carmen, M.D.)
<QI_PROC><age>70-year-old</age></QI_PROC>
<QI_PROC><gender>woman</gender></QI_PROC>
<QI_PROC><gender>she</gender></QI_PROC>

TABLE 6-continued

<QI_PROC><diagnosis>left renal mass</diagnosis></QI_PROC>
~~<QI_PROC><procedure>laparoscopic partial nephrectomy</procedure></QI_PROC>~~
<QI_PROC><date>Aug. 15, 2013</date></QI_PROC>
<QI_PROC><date>Aug. 17, 2013</date></QI_PROC>
Transcript of Voice Recording 2 (Speaker 1: Dudley, Carmen, M.D.)
<QI_PROC><gender>mr.</gender></QI_PROC>
<QI_PROC><gender>he</gender></QI_PROC>
<QI_PROC><gender>his</gender></QI_PROC>
<QI_PROC><age>65-y.o.</age></QI_PROC>
<QI_PROC><date>Aug. 16, 2013</date></QI_PROC>
<QI_PROC><date>Aug. 16, 2013</date></QI_PROC>
<QI_PROC><diagnosis>weakness and balance issues</diagnosis></QI_PROC>
Transcript of Voice Recording 3 (Speaker 2: Bob, Veep, M.D.)
<QI_PROC><age>68 years old</age></QI_PROC>
<QI_PROC><gender>female</gender></QI_PROC>
<QI_PROC><gender>she</gender></QI_PROC>
<QI_PROC><diagnosis>pneumonia</diagnosis></QI_PROC>
<QI_PROC><date>Aug. 14, 2013</date></QI_PROC>
<QI_PROC><date>Aug. 17, 2013</date></QI_PROC>

As shown in Table 6, each quasi-identifier extracted is tagged with tags that indicate a known type included in the PLQ. As procedure is not a known type included in the PLQ, the quasi-identifier "laparoscopic partial nephrectomy" tagged with tags that indicate procedure is suppressed in the transcripts.

Table 7 below provides example records of structured data created by the content de-identification unit 460 in accordance with PLQ Element 1.

TABLE 7

| PLQ Element 1 | | |
| --- | --- | --- |
| ID | age | gender |
| doc1 | 70 | Female |
| doc2 | 65 | Male |
| doc3 | 68 | Female |

As shown in Table 7, each record created has a corresponding identifier (ID) indicative of a transcript that quasi-identifiers the record maintains original values for are extracted from. The quasi-identifiers are tagged with tags that indicate the known types age or gender.

Table 8 below provides example records of structured data created by the content de-identification unit 460 in accordance with PLQ Element 2.

TABLE 8

| PLQ Element 2 | |
| --- | --- |
| ID | dates <sequence> |
| doc1 | Aug. 15, 2013 → Aug. 17, 2013 |
| doc2 | Aug. 16, 2013 → Aug. 16, 2013 |
| doc3 | Aug. 14, 2013 → Aug. 17, 2013 |

As shown in Table 8, each record created has a corresponding ID indicative of a transcript that a quasi-identifier the record maintains an original value for is extracted from. The quasi-identifier is tagged with tags that indicate the known type date.

Table 9 below provides example records of structured data created by the content de-identification unit 460 in accordance with PLQ Element 3.

TABLE 9

| PLQ Element 3 | |
| --- | --- |
| ID | diagnoses <set> |
| doc1 | left renal mass |
| doc2 | weakness and balance issues |
| doc3 | Pneumonia |

As shown in Table 9, each record created has a corresponding ID indicative of a transcript that a quasi-identifier the record maintains an original value for is extracted from. The quasi-identifier is tagged with tags that indicate the known type diagnoses.

Assume $k_c=2$. In one embodiment, for each of the individuals (i.e., patients) Jane Alan, Ted Borret, and Cathie Trian, the content de-identification unit 460 is configured to generate corresponding de-identified textual content, such that a likelihood of a third party (e.g., an attacker) performing a successful re-identification of the individual from the de-identified textual content is bounded by ½.

Table 10 below provides example anonymized records of structured data resulting from the content de-identification unit 460 applying relational 2-anonymity to the records of Table 7 to anonymize original values maintained in the records to generalized values. For reference, original values suppressed by the content de-identification unit 460 are shown as an asterisk (*).

TABLE 10

| PLQ Element 1 | | |
| --- | --- | --- |
| ID | age | gender |
| doc1 | 65-70 | * |
| doc2 | 65-70 | * |
| doc3 | 65-70 | * |

Table 11 below provides example anonymized records of structured data resulting from the content de-identification unit 460 applying sequence 2-anonymization (order-preserving) to the records of Table 8 to anonymize original values maintained in the records to generalized values.

TABLE 11

| PLQ Element 2 | |
| --- | --- |
| ID | Date <sequence> |
| doc1 | Aug. {14-16}, 2013 → Aug. {16-17}, 2013 |
| doc2 | Aug. {14-16}, 2013 → Aug. {16-17}, 2013 |
| doc3 | Aug. {14-16}, 2013 → Aug. {16-17}, 2013 |

Table 12 below provides example anonymized records of structured data resulting from the content de-identification unit 460 applying set 2-anonymization to the records of Table 9 to anonymize original values maintained in the records to generalized values. For reference, original values suppressed by the content de-identification unit 460 are shown as an asterisk (*).

TABLE 12

| | PLQ Element 3 | |
|---|---|---|
| ID | Diagnoses <set> | |
| doc1 | head-related medical issue | |
| doc2 | head-related medical issue | |
| doc3 | * | |

Table 13 below provides example anonymized records of structured data resulting from the content de-identification unit 460 applying micro-aggregation approach to the records of Table 10 to obtain random values computed over a micro-aggregate. For reference, each random value is shown in parenthesis.

TABLE 13

| | PLQ Element 1 | |
|---|---|---|
| ID | Age | Gender |
| doc1 | 65-70 (67) | * |
| doc2 | 65-70 (68) | * |
| doc3 | 65-70 (66) | * |

Table 14 below provides example anonymized records of structured data resulting from the content de-identification unit 460 applying micro-aggregation approach to the records of Table 11 to obtain random values computed over a micro-aggregate. For reference, each random value is shown in parenthesis.

TABLE 14

| | PLQ Element 2 |
|---|---|
| ID | Date <sequence> |
| doc1 | Aug. {14-16}, 2013 (Aug. 15, 2013) → Aug. {16-17}, 2013 (Aug. 16, 2013) |
| doc2 | Aug. {14-16}, 2013 (Aug. 15, 2013) → Aug. {16-17}, 2013 (Aug. 17, 2013) |
| doc3 | Aug. {14-16}, 2013 (Aug. 16, 2013) → Aug. {16-17}, 2013 (Aug. 17, 2013) |

Table 15 below provides example anonymized records of structured data resulting from the content de-identification unit 460 applying micro-aggregation approach to the records of Table 12 to obtain random values computed over a micro-aggregate. For reference, each random value is shown in parenthesis.

TABLE 15

| | PLQ Element 3 |
|---|---|
| ID | Diagnoses <set> |
| doc1 | head-related medical problem (weakness) |
| doc2 | head-related medical problem (renal mass) |
| doc3 | * |

As shown in Tables 13-15, each random value of each record is a plausible replacement value that can be used to replace a corresponding quasi-identifier in a transcript that the quasi-identifier is extracted from. Each random value is randomly chosen from generalized values produced as a result of applying an anonymization algorithm. In the case of categorical values, random value can be randomly chosen from a set of original values, or from a subtree rooted at a node with a generalized value (e.g., "head-related medical issue").

Table 16 below provides example de-identified transcripts resulting from the content de-identification unit 460 replacing some quasi-identifiers recognized in the transcripts of Table 2 with replacement values of Tables 13-15 and removing tags of the quasi-identifiers. For reference, original values suppressed by the content de-identification unit 460 are shown as an asterisk (*).

TABLE 16

De-Identified Transcript of Voice Recording 1 (Speaker 1: Dudley, Carmen, M.D.)
Mary Quinn is a 67-year-old with a history of a head-related medical problem who came for a procedure. Was admitted on Aug. 15, 2013 and discharged on Aug. 16, 2013. Was asked to follow up with Dr. Capeman.
De-Identified Transcript of Voice Recording 2 (Speaker 1: Dudley, Carmen, M.D.)
Albert Somaya is 68 years old. Was admitted on Aug. 15, 2013 to evaluate for head-related medical problem. * was found * and was asked to *. Was discharged on Aug. 17, 2013. Was given no prescription.
De-Identified Transcript of Voice Recording 3 (Speaker 2: Bob, Veep, M.D.)
Ted Burner is a 66 years old with *. Attended * event and had *. Went to the * department and * were found. Was admitted on Aug. 16, 2013 to the * for care of * and discharged on Aug. 17, 2013. Was instructed to follow up with Dr. Rott.

As shown in Table 16, the de-identified transcripts of Voice Recording 1 and Voice Recording 2 are mapped to Speaker 1 (the clinician Carmen Dudley, M.D.), and the de-identified transcript of Voice Recording 3 is mapped to Speaker 2 (the clinician Veep Bob, M.D.). As shown in Table 16, the de-identified transcripts do not reveal any privacy-sensitive personal information about the individuals (i.e., patients) Jane Alan, Ted Borret, and Cathie Trian.

Figure 6:
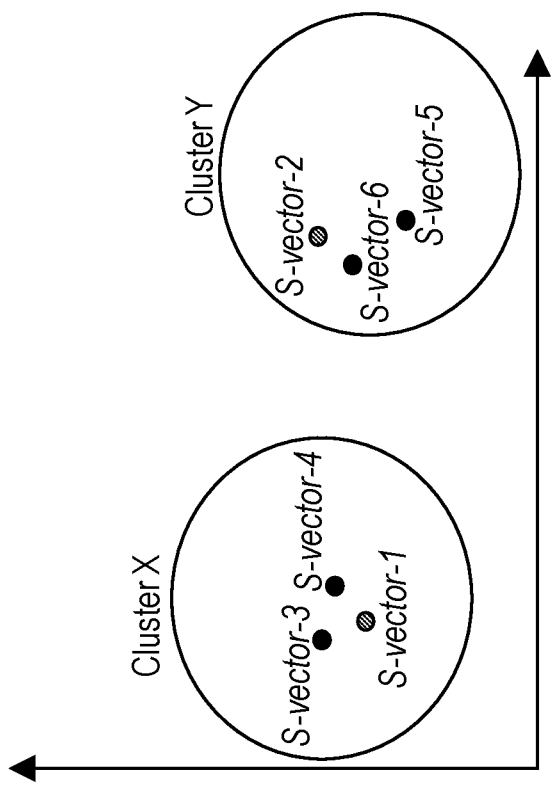
FIG. 6 illustrates an example graphical representation of feature vectors of speakers in a two-dimensional space, in accordance with an embodiment of the invention.

FIG. 6 illustrates an example graphical representation of feature vectors of speakers in a two-dimensional space, in accordance with an embodiment of the invention. The synthetic speaker identity creation unit 480 obtains each feature vector corresponding to each of the six speakers from the database, and clusters all the feature vectors obtained based on a vector similarity measure/metric (e.g., Euclidean distance or cosine similarity measure). Assume $k_s=3$. The synthetic speaker identity creation unit 480 clusters all the feature vectors obtained into two separate clusters, Cluster X and Cluster Y, wherein each cluster comprises feature vectors corresponding to three similar speakers. As shown in FIG. 6, Cluster X comprises a feature vector S-vector-1 corresponding to Speaker 1 (the clinician Carmen Dudley, M.D.), a feature vector S-vector-3 corresponding to Speaker 3, and a feature vector S-vector-4 corresponding to Speaker 4. Cluster Y comprises a feature vector S-vector-2 corresponding to Speaker 2 (the clinician Veep Bob, M.D.), a feature vector S-vector-5 corresponding to Speaker 5, and a feature vector S-vector-6 corresponding to Speaker 6.

For each cluster, the synthetic speaker identity creation unit 480 applies an aggregation function over speaker identity features of all feature vectors included in the cluster, and generates a synthetic speaker identity corresponding to the cluster based on resulting aggregated speaker identity features. In one embodiment, the synthetic speaker identity creation unit 480 constructs a synthetic vector $V_X$ corresponding to Cluster X by computing a min, a max, and an average of all feature vectors included in Cluster X, and further constructs a synthetic vector $V_Y$ corresponding to Cluster Y by computing a min, a max, and an average of all feature vectors included in Cluster Y. In another embodiment, the synthetic speaker identity creation unit 480 constructs a synthetic vector $V_X$ corresponding to Cluster X by randomly selecting a value for each speaker identity feature from all feature vectors included in Cluster X, and further constructs a synthetic vector $V_Y$ corresponding to Cluster Y by randomly selecting a value for each speaker identity feature from all feature vectors included in Cluster Y. The synthetic vectors $V_X$ and $V_Y$ represent synthetic speaker identities corresponding to Cluster X and Cluster Y, respectively.

As the feature vector S-vector-1 corresponding to Speaker 1 (the clinician Carmen Dudley, M.D.) is included in Cluster X, the synthetic speaker identity creation unit 480 selects Cluster Y as the cluster that lies as far as possible from Cluster X, and synthesizes new speech waveforms based on the synthetic vector $V_Y$ for delivering the de-identified transcripts of Voice Recording 1 and Voice Recording 2 (see Table 16 above). As the feature vector S-vector-2 corresponding to Speaker 2 (the clinician Veep Bob, M.D.) is included in Cluster Y, the synthetic speaker identity creation unit 480 selects Cluster X as the cluster that lies as far as possible from Cluster Y, and synthesizes a new speech waveform based on the synthetic vector $V_X$ for delivering the de-identified transcript of Voice Recording 3 (see Table 16 above). In summary, the synthetic speaker identity creation unit 480 creates two different synthetic speaker identities (i.e., synthetic vectors $V_X$ and $V_Y$) for two different speakers (i.e., the clinicians Carmen Dudley, M.D. and Veep Bob, M.D.) that are used to synthesize new speech waveforms for delivering de-identified transcripts of three different voice recordings (i.e., Voice Recording 1, Voice Recording 2, and Voice Recording 3). In one embodiment, for each of the two different speakers (i.e., the clinicians Carmen Dudley, M.D. and Veep Bob, M.D.), the synthetic speaker identity creation unit 480 is configured to create a corresponding synthetic speaker identity, such that a likelihood of a third party (e.g., an attacker) performing a successful re-identification of the speaker from a new speech waveform synthesized using the synthetic speaker identity is bounded by ⅓.

Table 17 below provides example de-identified voice recordings comprising the new speech waveforms synthesized by the synthetic speaker identity creation unit 480 using the synthetic vectors $V_X$ and $V_Y$. For reference, de-identified transcripts delivered by the new speech waveforms are shown in quotes.

TABLE 17

De-identified Voice Recording 1 (Speaker: synthetic speaker identity $V_Y$)
Speech/Waveform of "Mary Quinn is a 67-year-old with a history of a head-related medical problem who came for a procedure. Was admitted on Aug. 15, 2013 and discharged on Aug. 16, 2013. Was asked to follow up with Dr. Capeman."
De-identified Voice Recording 2 (Speaker: synthetic speaker identity $V_Y$)
Speech/Waveform of "Albert Somaya is 68 years old. Was admitted on Aug. 15, 2013 to evaluate for head-related medical problem. * was found * and was asked to *. Was discharged on Aug. 17, 2013. Was given no prescription."
De-identified Voice Recording 3 (Speaker: synthetic speaker identity $V_X$)
Speech/Waveform of "Ted Burner is a 66 years old with *. Attended * event and had *. Went to the * department and * were found. Was admitted on Aug. 16, 2013 to the * for care of * and discharged on Aug. 17, 2013. Was instructed to follow up with Dr. Rott."

The output unit 490 releases the de-identified voice recordings of Table 17 to a third party for secondary use. As shown in Table 17, the de-identified voice recordings do not reveal the identities of Speaker 1 and Speaker 2 (i.e., the clinicians Carmen Dudley, M.D. and Veep Bob, M.D.), and the de-identified transcripts do not reveal any privacy-sensitive personal information about the individuals (i.e., patients) Jane Alan, Ted Borret, and Cathie Trian.

Figure 7:
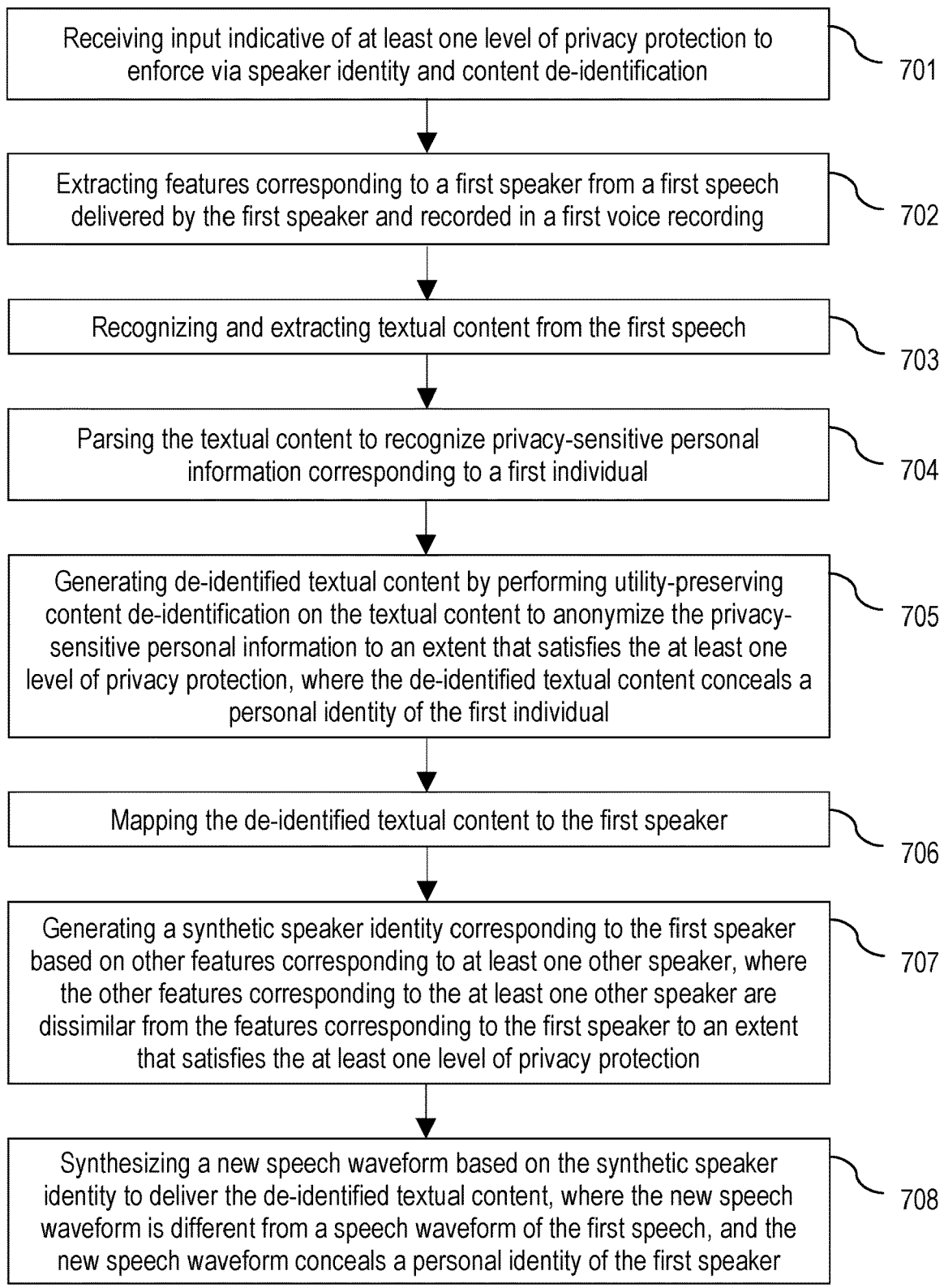
FIG. 7 is a flowchart for an example process for speaker identity and content de-identification, in accordance with an embodiment of the invention.

FIG. 7 is a flowchart for an example process 700 for speaker identity and content de-identification, in accordance with an embodiment of the invention. Process block 701 includes receiving input indicative of at least one level of privacy protection to enforce via speaker identity and content de-identification. Process block 702 includes extracting features corresponding to a first speaker from a first speech delivered by the first speaker and recorded in a first voice recording. Process block 703 includes recognizing and extracting textual content from the first speech. Process block 704 includes parsing the textual content to recognize privacy-sensitive personal information corresponding to a first individual. Process block 705 includes generating de-identified textual content by performing utility-preserving content de-identification on the textual content to anonymize the privacy-sensitive personal information to an extent that satisfies the at least one level of privacy protection, where the de-identified textual content conceals a personal identity of the first individual. Process block 706 includes mapping the de-identified textual content to the first speaker. Process block 707 includes generating a synthetic speaker identity corresponding to the first speaker based on other features corresponding to at least one other speaker, where the other features corresponding to the at least one other speaker are dissimilar from the features corresponding to the first speaker to an extent that satisfies the at least one level of privacy protection. Process block 708 includes synthesizing a new speech waveform based on the synthetic speaker identity to deliver the de-identified textual content, where the new speech waveform is different from a speech waveform of the first speech, and the new speech waveform conceals a personal identity of the first speaker.

In one embodiment, process blocks 701-708 are performed by one or more components of the system 330.

Figure 8:
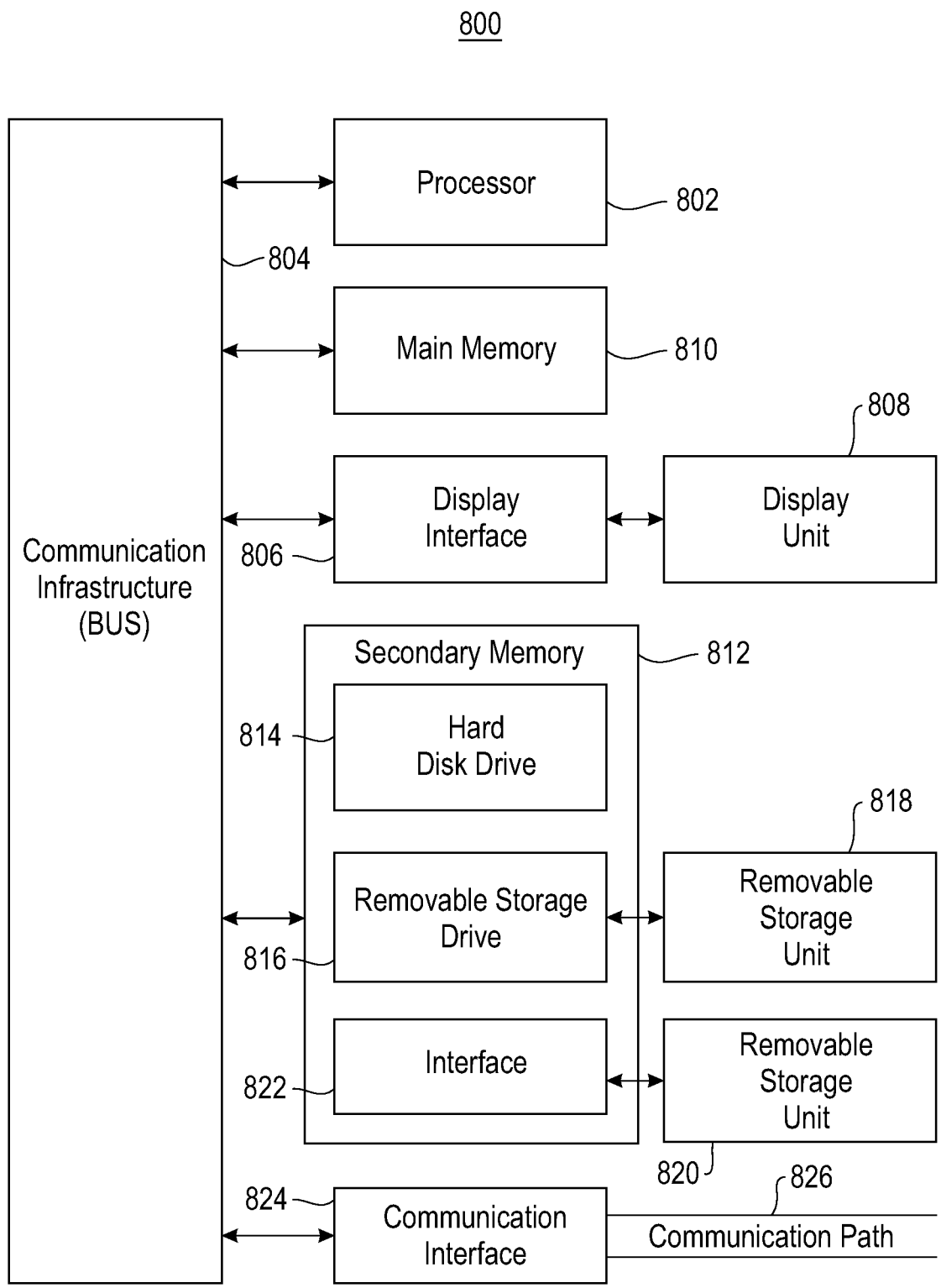
FIG. 8 is a high-level block diagram showing an information processing system useful for implementing an embodiment of the invention.

FIG. 8 is a high-level block diagram showing an information processing system 800 useful for implementing one embodiment of the invention. The computer system includes one or more processors, such as processor 802. The processor 802 is connected to a communication infrastructure 804 (e.g., a communications bus, cross-over bar, or network).

The computer system can include a display interface 806 that forwards graphics, text, and other data from the voice communication infrastructure 804 (or from a frame buffer not shown) for display on a display unit 808. In one embodiment, the computer system also includes a main memory 810, preferably random access memory (RAM), and also includes a secondary memory 812. In one embodiment, the secondary memory 812 includes, for example, a hard disk drive 814 and/or a removable storage drive 816, representing, for example, a floppy disk drive, a magnetic tape drive, or an optical disk drive. The removable storage drive 816 reads from and/or writes to a removable storage unit 818 in a manner well known to those having ordinary skill in the art. Removable storage unit 818 represents, for example, a floppy disk, a compact disc, a magnetic tape, or an optical disk, etc. which is read by and written to by removable storage drive 816. As will be appreciated, the removable storage unit 818 includes a computer readable medium having stored therein computer software and/or data.

In alternative embodiments, the secondary memory 812 includes other similar means for allowing computer programs or other instructions to be loaded into the computer system. Such means include, for example, a removable storage unit 820 and an interface 822. Examples of such means include a program package and package interface (such as that found in video game devices), a removable memory chip (such as an EPROM, or PROM) and associated socket, and other removable storage units 820 and interfaces 822, which allows software and data to be transferred from the removable storage unit 820 to the computer system.

In one embodiment, the computer system also includes a communication interface 824. Communication interface 824 allows software and data to be transferred between the computer system and external devices. In one embodiment, examples of communication interface 824 include a modem, a network interface (such as an Ethernet card), a communication port, or a PCMCIA slot and card, etc. In one embodiment, software and data transferred via communication interface 824 are in the form of signals which are, for example, electronic, electromagnetic, optical, or other signals capable of being received by communication interface 824. These signals are provided to communication interface 824 via a communication path (i.e., channel) 826. In one embodiment, this communication path 826 carries signals and is implemented using wire or cable, fiber optics, a phone line, a cellular phone link, an RF link, and/or other communication channels.

Embodiments of the invention may be a system, a method, and/or a computer program product at any possible technical detail level of integration. The computer program product may include a computer readable storage medium (or media) having computer readable program instructions thereon for causing a processor to carry out aspects of embodiments of the invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the invention.

Aspects of embodiments of the invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

From the above description, it can be seen that embodiments of the invention provide a system, computer program product, and method for implementing the embodiments of the invention. Embodiments of the invention further provide a non-transitory computer-useable storage medium for implementing the embodiments of the invention. The non-transitory computer-useable storage medium has a computer-readable program, wherein the program upon being processed on a computer causes the computer to implement the steps of embodiments of the invention described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments of the invention only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The descriptions of the various embodiments of the invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for speaker identity and content de-identification under data privacy guarantees, comprising:
   receiving a set of voice recordings of different speeches delivered by different speakers;
   for each of the different speakers, extracting features corresponding to the speaker from at least one of the different speeches, wherein the at least one speech is delivered by the speaker;
   clustering all extracted features into different clusters based on similarity;
   extracting textual content from a first speech of the different speeches, wherein the first speech is delivered by a first speaker of the different speakers;
   generating de-identified textual content by anonymizing privacy-sensitive personal information included in the textual content;
   generating a synthetic speaker identity corresponding to the first speaker based on extracted features included in a first cluster of the different clusters, wherein the first cluster is different from a second cluster of the different clusters, and the second cluster includes extracted features corresponding to the first speaker; and
   synthesizing a new speech waveform based on the synthetic speaker identity to deliver the de-identified textual content, wherein the new speech waveform is different from a speech waveform of the first speech.

2. The method of claim 1, wherein each cluster comprises extracted features corresponding to one or more of the plurality of speakers, and the one or more speakers have similar speech waveforms.

3. The method of claim 1, further comprising:
receiving input indicative of at least one level of privacy protection, wherein the synthetic speaker identity and the de-identified textual content satisfy the at least one level of privacy protection.

4. The method of claim 3, wherein the extracted features included in the first cluster are dissimilar from the extracted features corresponding to the first speaker to an extent that satisfies the at least one level of privacy protection.

5. The method of claim 1, wherein the first cluster lies furthest away from the second cluster.

6. The method of claim 1, wherein generating the synthetic speaker identity comprises:
applying an aggregation function over the extracted features included in the first cluster, wherein the synthetic speaker identity is further based on aggregated features resulting from applying the aggregation function.

7. A system for speaker identity and content de-identification under privacy guarantees, comprising:
at least one processor; and
a non-transitory processor-readable memory device storing instructions that when executed by the at least one processor causes the at least one processor to perform operations including:
receiving a set of voice recordings of different speeches delivered by different speakers;
for each of the different speakers, extracting features corresponding to the speaker from at least one of the different speeches, wherein the at least one speech is delivered by the speaker;
clustering all extracted features into different clusters based on similarity;
extracting textual content from a first speech of the different speeches, wherein the first speech is delivered by a first speaker of the different speakers;
generating de-identified textual content by anonymizing privacy-sensitive personal information included in the textual content;
generating a synthetic speaker identity corresponding to the first speaker based on extracted features included in a first cluster of the different clusters, wherein the first cluster is different from a second cluster of the different clusters, and the second cluster includes extracted features corresponding to the first speaker; and
synthesizing a new speech waveform based on the synthetic speaker identity to deliver the de-identified textual content, wherein the new speech waveform is different from a speech waveform of the first speech.

8. The system of claim 7, wherein each cluster comprises extracted features corresponding to one or more of the plurality of speakers, and the one or more speakers have similar speech waveforms.

9. The system of claim 7, wherein the operations further include:
receiving input indicative of at least one level of privacy protection, wherein the synthetic speaker identity and the de-identified textual content satisfy the at least one level of privacy protection.

10. The system of claim 9, wherein the extracted features included in the first cluster are dissimilar from the extracted features corresponding to the first speaker to an extent that satisfies the at least one level of privacy protection.

11. The system of claim 7, wherein the first cluster lies furthest away from the second cluster.

12. The system of claim 7, wherein generating the synthetic speaker identity comprises:
applying an aggregation function over the extracted features included in the first cluster, wherein the synthetic speaker identity is further based on aggregated features resulting from applying the aggregation function.

13. A computer program product for speaker identity and content de-identification under privacy guarantees, the computer program product comprising a non-transitory computer readable storage medium having program instructions embodied therewith, the program instructions executable by a processor to cause the processor to:
receive a set of voice recordings of different speeches delivered by different speakers;
for each of the different speakers, extract features corresponding to the speaker from at least one of the different speeches, wherein the at least one speech is delivered by the speaker;
cluster all extracted features into different clusters based on similarity;
extract textual content from a first speech of the different speeches, wherein the first speech is delivered by a first speaker of the different speakers;
generate de-identified textual content by anonymizing privacy-sensitive personal information included in the textual content;
generate a synthetic speaker identity corresponding to the first speaker based on extracted features included in a first cluster of the different clusters, wherein the first cluster is different from a second cluster of the different clusters, and the second cluster includes extracted features corresponding to the first speaker, and
synthesize a new speech waveform based on the synthetic speaker identity to deliver the de-identified textual content, wherein the new speech waveform is different from a speech waveform of the first speech.

14. The computer program product of claim 13, wherein each cluster comprises extracted features corresponding to one or more of the plurality of speakers, and the one or more speakers have similar speech waveforms.

15. The computer program product of claim 13, wherein the program instructions executable by the processor further cause the processor to:
receive input indicative of at least one level of privacy protection, wherein the synthetic speaker identity and the de-identified textual content satisfy the at least one level of privacy protection.

16. The computer program product of claim 15, wherein the extracted features included in the first cluster are dissimilar from the extracted features corresponding to the first speaker to an extent that satisfies the at least one level of privacy protection.

17. The computer program product of claim 13, wherein the first cluster lies furthest away from the second cluster.

18. The computer program product of claim 13, wherein the program instructions executable by the processor cause the processor to generate the synthetic speaker identity by:
applying an aggregation function over the extracted features included in the first cluster, wherein the synthetic speaker identity is further based on aggregated features resulting from applying the aggregation function.

* * * * *